United States Patent
Meador et al.

(10) Patent No.: US 10,787,569 B1
(45) Date of Patent: *Sep. 29, 2020

(54) PROCESS FOR PREPARING AEROGELS FROM POLYAMIDES

(71) Applicant: United States of America, as represented by the Administrator of NASA, Washington, DC (US)

(72) Inventors: Mary Ann B. Meador, Strongsville, OH (US); Jarrod C. Williams, Lakewood, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/978,870

(22) Filed: May 14, 2018

Related U.S. Application Data

(62) Division of application No. 14/193,719, filed on Feb. 28, 2014, now Pat. No. 10,011,719.

(60) Provisional application No. 61/771,189, filed on Mar. 1, 2013.

(51) Int. Cl.
   *C08L 77/06* (2006.01)
   *C08G 69/26* (2006.01)

(52) U.S. Cl.
   CPC ............. *C08L 77/06* (2013.01); *C08G 69/26* (2013.01); *C08J 2205/026* (2013.01); *C08J 2377/10* (2013.01)

(58) Field of Classification Search
   None
   See application file for complete search history.

(56) References Cited

U.S. PATENT DOCUMENTS

| | | | |
|---|---|---|---|
| 3,892,665 | A | 7/1975 | Steigelmann et al. |
| 3,892,785 | A | 7/1975 | Billigmeier et al. |
| 4,876,328 | A | 10/1989 | Lubowitz et al. |
| 5,008,342 | A | 4/1991 | Phadke |
| 5,109,105 | A | 4/1992 | Lubowitz et al. |
| 5,143,636 | A | 9/1992 | Gaucher et al. |
| 6,989,123 | B2 | 1/2006 | Lee et al. |
| 7,780,890 | B2 | 8/2010 | Lee et al. |
| 2006/0084707 | A1 | 4/2006 | Ou et al. |
| 2006/0264132 | A1 | 11/2006 | Leeser et al. |
| 2009/0082479 | A1 | 3/2009 | Cho |
| 2010/0080949 | A1 | 4/2010 | Ou et al. |
| 2011/0071231 | A1 | 3/2011 | Park et al. |

(Continued)

FOREIGN PATENT DOCUMENTS

JP   2003034733 A   *  2/2003

*Primary Examiner* — Rachel Kahn
(74) *Attorney, Agent, or Firm* — Robert H. Earp, III; Mark Allen Wolfgang; Helen M. Galus

(57) ABSTRACT

Polyamide aerogels and methods of making the same are discussed. One example method can include the act of creating a mixture of at least one diamine with at least one diacid chloride in a first solvent. The mixture can comprise a plurality of amine capped polyamide oligomers. Such a method can also include the acts of adding a cross-linking agent to the mixture to create a gel and performing one or more solvent exchanges to remove the first solvent. Additionally, such a method can include the act of subjecting the gel to supercritical drying to polyamide aerogel.

11 Claims, 18 Drawing Sheets

(56) References Cited

U.S. PATENT DOCUMENTS

2011/0105636 A1 5/2011 Kim et al.
2011/0245362 A1 10/2011 Hwang et al.
2012/0088855 A1 4/2012 Gawryla et al.

* cited by examiner

X=

Y=

| Sample | n | %para | Polymer conc., wt % | Density, g/cm³ | Porosity, % | Surface area, m²/g | Dielectric constant, X-band | Modulus, MPa | Stress at 10% Strain (MPa) | Loss tangent |
|---|---|---|---|---|---|---|---|---|---|---|
| 1 | 30 | 50 | 10 | 0.15 | 90 | 225.49 | 1.26 | 40.87 | 0.77 | 0.009 |
| 2 | 30 | 50 | 7.5 | 0.12 | 91 | 228.43 | 1.23 | 26.26 | 0.58 | 0.007 |
| 3 | 30 | 50 | 7.5 | 0.12 | 92 | 197.6 | 1.18 | 24.00 | 0.52 | 0.006 |
| 4 | 40 | 100 | 5 | .18 | 88 | 346.6 | 1.28 | Not tested | Not tested | 0.011 |
| 5 | 20 | 100 | 5 | 0.22 | 86 | 366.08 | 1.34 | 169.21 | 1.59 | 0.014 |
| 6 | 20 | 0 | 10 | ---- | ---- | 119 | ---- | ---- | ---- | ---- |
| 7 | 40 | 100 | 10 | 0.36 | 77 | 271.19 | 1.58 | 213.91 | 5.03 | 0.024 |
| 8 | 30 | 50 | 5 | 0.08 | 94 | 166.17 | 1.17 | 5.63 | 0.19 | 0.007 |
| 9 | 20 | 100 | 10 | 0.33 | 76 | 384.55 | 1.53 | 101.26 | 3.77 | 0.019 |
| 10 | 20 | 0 | 5 | 0.06 | 96 | 111.05 | 1.15 | 58.03 | 0.34 | 0.006 |
| 11 | 30 | 100 | 7.5 | 0.30 | 79 | 274.69 | 1.45 | 312.11 | 3.00 | 0.014 |
| 12 | 40 | 0 | 5 | ---- | 94 | 47.79 | ---- | ---- | ---- | ---- |
| 13 | 30 | 0 | 7.5 | 0.10 | 94 | 136.56 | 1.19 | 125.19 | 0.61 | 0.006 |
| 14 | 20 | 50 | 7.5 | 0.13 | 92 | 247.23 | 1.22 | 24.56 | 0.66 | 0.007 |
| 15 | 30 | 50 | 7.5 | 0.13 | 91 | 190.45 | 1.24 | 19.82 | 0.58 | 0.008 |
| 16 | 40 | 0 | 10 | 0.16 | 86 | 95.54 | 1.42 | 47.81 | 1.34 | 0.015 |
| 17 | 30 | 50 | 7.5 | 0.10 | 93 | 209.1 | 1.17 | 12.82 | 0.30 | 0.005 |
| 18 | 30 | 50 | 7.5 | 0.11 | 93 | 251.75 | 1.21 | 16.08 | 0.39 | 0.006 |
| 19 | 40 | 50 | 7.5 | 0.13 | 90 | 161.85 | 1.21 | Not tested | Not tested | 0.007 |

FIG. 4

PROCESS FOR PREPARING AEROGELS FROM POLYAMIDES

CROSS-REFERENCE TO RELATED APPLICATIONS

This application claims priority to, and is a Divisional of, U.S. patent application Ser. No. 14/193,719 entitled "Process for Preparing Aerogels from Polyamides" and filed on Feb. 28, 2014, which claims the benefit of U.S. Provisional Patent Application Ser. No. 61/771,189 entitled 'Process for Preparing Aerogels from Polyamides' and filed Mar. 1, 2013. The entirety of the above-noted applications are incorporated by reference herein.

ORIGIN OF THE INVENTION

The invention described herein was made by employees of the United States Government and may be manufactured and used by or for the Government for Government purposes without the payment of any royalties thereon or therefor.

The invention described herein was also made in the performance of work under a NASA contract and is subject to the provisions of Section 305 of the National Aeronautics and Space Act, Public Law 111-314, § 3 (124 Stat. 3330, 51 U.S.C. Chapter 201).

BACKGROUND

Aerogels are porous solids with high surface areas that are made by forming a gel network and removing the solvent without causing pore collapse. Due to characteristics such as high surface area, high porosity, and low density, these lightweight aerogels are attractive for use as thermal insulators, low dielectric substrates, catalyst supports, and as building and construction materials. A great deal of attention has been paid to investigating alternate aerogel backbones such as polymers and polymer-silica hybrids in order to overcome the fragility and lack of flexibility associated with silica aerogels.

The inherent fragility of silica aerogels has been addressed in several ways. One approach involves the reaction of oligomers containing functional moieties such as styrene, epoxy, or isocyanate with pendant functionalities on the silica backbone such as amines, hydroxyl or vinyl groups that are either covalently linked to a preformed aerogel or attached during oligomerization and gelation. More robust aerogels are obtained but at the expense of the use temperature. Furthermore, while the compressive moduli of, for example, epoxy cross-linked silica aerogels can be quite high (326 MPa), these increases come at the expense of substantial increases in density (0.85 g/cm3).

More recently, polymer aerogels have been fabricated through the formation of either chemically or physically cross-linked networks which avoid the use of silica altogether. Polymer aerogels tend to be more robust than pure silica aerogels and since factors such as polymer chain length and cross-link density can be controlled it is possible to generate a broad spectrum of properties from a few simple monomers. For example, syndiotactic polystyrene aerogels have been produced by allowing hot solutions of the polymer to form physically interlinked semicrystalline domains that act as virtual cross-links upon cooling. These materials were found to be hygroscopic and were attractive sorption and desorption substrates for removing impurities from air and fluids; however, with their lack of covalent crosslinks, and resulting poor mechanical properties, alternative strategies were employed resulting in increased Young's moduli for these materials.

One strategy for improving the mechanical properties of polymer aerogels has been to investigate composites. A recent investigation has shown that the addition of carbon nanotubes to thermo-reversible polystyrene gels results in their homogenous dispersion and the formation of an interpenetrating 3D network of nanotubes and physically bonded polystyrene domains. The net result was no change for the surface areas but an enhancement of the compressive moduli of the materials with values as high as 6.4 MPa at 0.06 g/cm$^3$. Polystyrene aerogels of the same density, but without nanotube reinforcement, had a lower compressive modulus at 4.2 MPa.

While physical cross-links and the formation of nanotube composites, as in the case of polystyrenes, give rise to modest increases in mechanical properties, a superior approach relies on the use of covalently cross-linked oligomers to form an aerogel. An illustrative example of this relies on the use of various di and tri isocyanates of varying geometries reacting with triethylamine and water in order to oligomerize, cross-link, and form polyurea aerogel networks with good mechanical properties. It was demonstrated that at a given density, these materials tended to have higher Young's moduli than their polystyrene and hybrid aerogel counterparts. Young's moduli ranging from 4 to 300 MPa were obtained in the density range of 0.03-0.55 g/cm$^3$. Even at densities of 0.03 g/cm$^3$, half the density of the strongest polystyrene nanocomposite aerogel, covalently cross-linked polyurea aerogels have a higher Young's modulus (7.03 MPa) than the polystyrenes. When compared to epoxy reinforced silica aerogels of similar densities, polyurea aerogels tend to have Young's moduli that are at least twice as large. For example, in the range of 0.19-0.20 g/cm$^3$, reinforced silica has a modulus of 13 MPa while covalently crosslinked polyurea aerogels have moduli around 33 MPa.

While these recent advancements in the areas of organic polymeric aerogels and inorganic hybrids have increased the strength and durability of these materials over pure silica aerogels, low use temperatures limit their utility. A substantial improvement over these earlier technologies was the development of the polyimide aerogels, which exhibit Young's moduli as high as 102 MPa at densities as low as 0.181 g/cm$^3$ making them, as a function of density, more rigid than isocyanate and styrene derived aerogels. The techniques used to fabricate them are simple and easily scalable. However, the use of relatively expensive diamines and dianhydrides coupled with the use of cross-linkers such as 1,3,5-triaminophenoxybenzene and octa(aminophenyl) silesquioxanes, which are not widely available, are limiting factors in their widespread application.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a method of producing a polyamide aerogel. One example method can include the act of creating a solution of at least one diamine with at least one diacid chloride in a first solvent. The solution can comprise a plurality of amine capped polyamide oligomers. Such a method can also include the acts of adding a cross-linking agent to the solution to create a gel and performing one or more solvent exchanges to remove the first solvent. Additionally, such a method can include the act of subjecting the gel to supercritical drying to polyamide aerogel.

In another aspect, the subject innovation can include one or more polyamide aerogels. One such example polyamide aerogel can include a microporous polyamide solid phase comprising cross-linked amine capped polyamide oligomers and a dispersed gaseous phase.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 4 illustrates a table summarizing the properties of the different polyamide aerogels studied in connection with experiments discussed herein.

DETAILED DESCRIPTION

Figure 1:
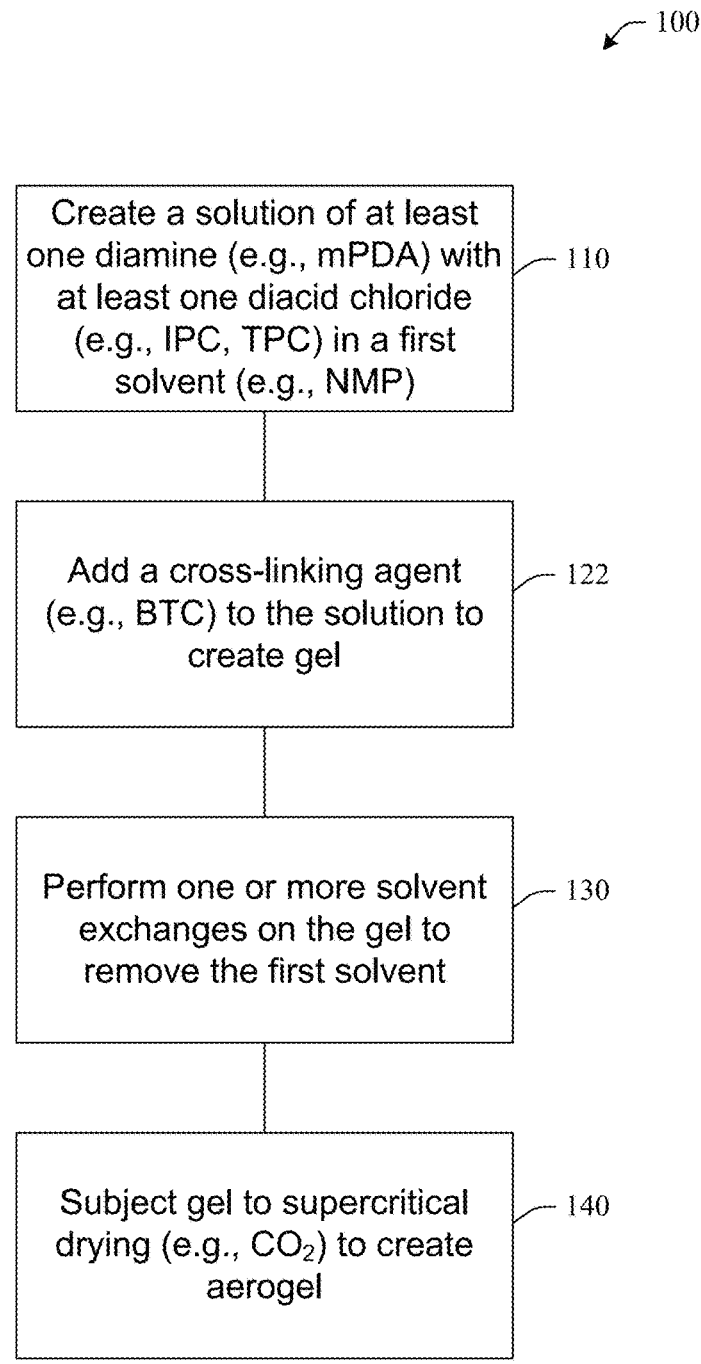
FIG. 1 illustrates a method of fabricating a polyamide aerogel in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In various aspects, the subject innovation can include a family of polymer aerogels (e.g., "gels" comprising a microporous solid and a gaseous dispersed phase, in contrast to the solid network and liquid dispersed phase of traditional gels), which can employ relatively inexpensive monomers and cross-linkers, namely aromatic polyamides (PAs), which also have a high onset of decomposition and high glass transition temperature. Furthermore, they can be made from monomers such as m-phenylenediamine (mPDA) or p-phenylenediamine (pPDA), isophthaloyl chloride (IPC), and terephthaloyl chloride (TPC) which are widely available at lower cost, making them an attractive alternative to polyimide aerogels.

The only conventional example of a PA aerogel previously reported relies on a non-conventional, high temperature reaction between a tri-isocyanate and a tricarboxylic acid in order to form the amide bond. It is limited by the fact that diisocyanates and dicarboxylic acids do not react in a fashion that is conducive to step-growth polymerization. It was reported that attempts at generating oligomer solutions from difunctional monomers with well-defined n values led to precipitation when diisocyanates and dicarboxylic acids were employed. In contrast, previous work has demonstrated that the classic step-growth reaction between diamines and diacid chlorides in N-methylpyrrolidinone, NMP, to form PAs allows for the formation of oligomers without precipitation at controlled molecular weights. PA aerogels made in NMP also do not need base catalyst. Due to the Lewis basicity of NMP, the HCl generated during the polymerization is kept from protonating the aromatic diamines and hindering their reaction with difunctional acid chlorides. In addition, the reaction proceeds at room temperature or below.

Based on this previous work, the subject innovation can include PA aerogels and methods of preparing PA aerogels by synthesizing amine end-capped oligomers from m-phenylene diamine (mPDA) and diacid chloride in NMP and cross-linking with benzenetricarbonyl trichloride (BTC), as discussed in greater detail below and as shown in the attached figures. The resulting gels can be dried using supercritical fluid extraction to form aerogels. In experiments discussed below, several parameters were examined in the fabrication of the aerogels, including formulated number of repeat units in the PA oligomers (n), the concentration of polymer in solution (w/w %) and the diacid chloride used to make the oligomers. For the last variable, either isophthaloyl chloride (IPC), or terephthaloyl chloride (TPC), or a 50/50 combination was used. Properties of the aerogels are discussed and related to these parameters.

The subject innovation can include polyamide aerogels and methods of making the same via cross-linking amine end capped oligomers in NMP to form materials with Young's moduli ranging from 5-312 MPa at densities between 0.06 and 0.33 g/cm$^3$. The materials can be made from inexpensive monomers and can be made as strong, rigid monoliths or thin flexible films. The resulting aerogels have porosities as high as 94% with internal surface areas as high as 385 m$^2$/g.

In aspects, the subject innovation relates to the synthesis of step-growth aromatic polyamide (PA) aerogels made using amine end-capped polyamide oligomers cross-linked with 1,3,5-benzenetricarbonyl trichloride (BTC). In various embodiments, isophthaloyl chloride (IPC) and or terephthaloyl chloride (TPC) can be combined with m-phenylene diamine (mPDA) in N-methylpyrrolidinone (NMP), to give amine capped polyamide oligomers formulated with between 20 and 40 repeat units (in some embodiments, however, depending on selection of materials, oligomers can be formulated with less than 20 or greater than 40 repeat units, including but not limited to examples provided herein). Addition of the crosslinking agent, BTC, typically induces gelation in under five minutes. Solvent exchange of the resulting gels into a suitable solvent, e.g., ethanol, can be followed by supercritical CO$_2$ drying, which can give colorless aerogels with densities ranging from 0.06 to 0.33 g/cm$^3$, compressive moduli between 5 and 312 MPa, and surface areas as high as 366 m$^2$/g. Embodiments containing IPC can give rise to flexible robust thin films while those that use only TPC can be fabricated as monoliths with compressive moduli of up to 312 Mpa. In accordance with experiments discussed herein, the dielectric properties of these aerogels were also measured in the X-band frequency range. It was found that relative dielectric constant decreased with density, with the lowest density aerogels having a relative dielectric constant as low as 1.15. The strong aerogels in accordance with various embodiments of the subject innovation can have potential application as insulation (e.g., terrestrially or otherwise, for example, in rovers, habitats, deployable structures, extravehicular activity suits, etc.), as low dielectric substrates (e.g., for antennas, etc.), etc.

Referring initially to the drawings, FIG. 1 illustrates a method 100 of fabricating a polyamide aerogel in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 100 can begin at 110, by creating a solution of at least one diamine (e.g., mPDA, etc.) with at least one diacid chloride (e.g., IPC, TPC, combinations thereof, etc.) in a first solvent (e.g., NMP, etc.). At 120, a cross-linking agent (e.g., BTC, 1,3,5-triaminophenoxy benzene (TAB), etc.) can be added to the solution to induce gelation, creating a gel. After gel formation, one or more solvent exchanges can be performed at 130 to remove the first solvent. After removal of the first solvent, the gel can be subjected to supercritical drying (e.g., supercritical CO$_2$ extraction, etc.) at 140 to remove the liquid phase and create a polyamide aerogel.

Figure 2:
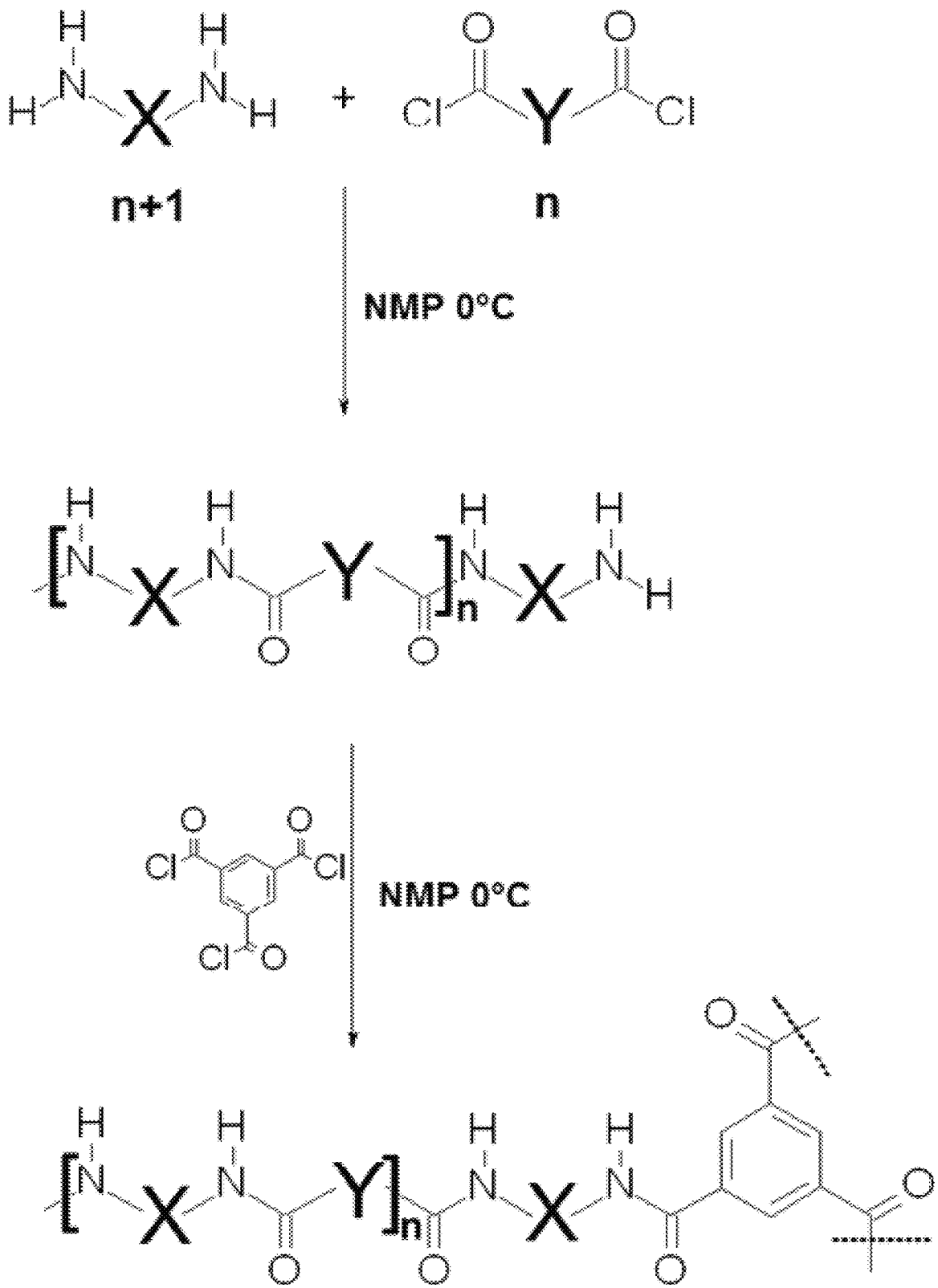
FIG. 2 illustrates a general reaction scheme for polymerization and cross-linking in accordance with aspects of the subject innovation.
Figure 3:
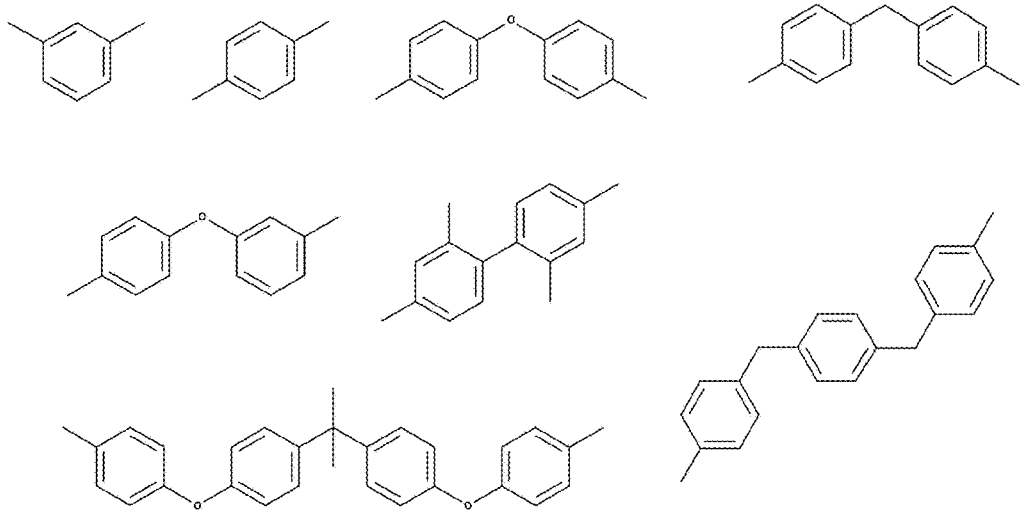
FIG. 3 illustrates moieties useable in various specific embodiments of the reaction scheme of FIG. 2.
Figure 3:
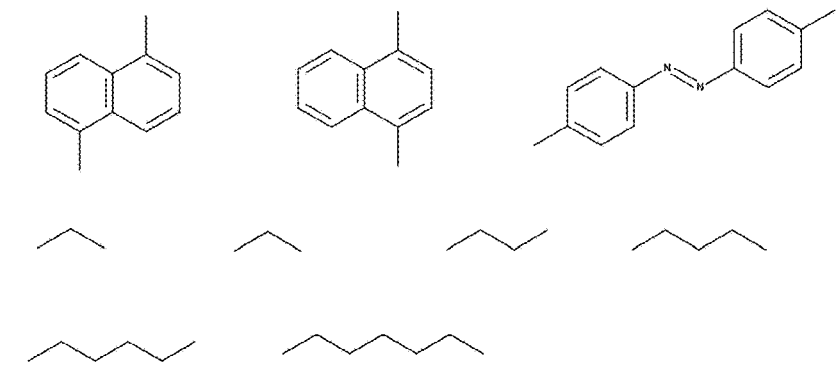
Figure 3:
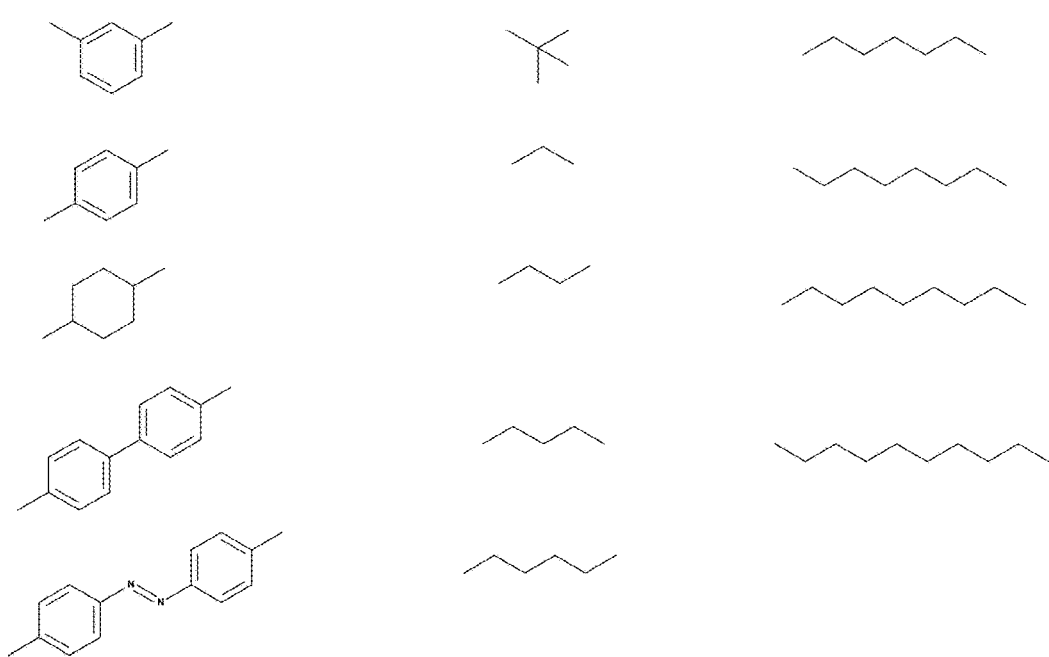

FIG. 2 illustrates a general reaction scheme for polymerization and cross-linking in accordance with aspects of the subject innovation. FIG. 3 illustrates moieties useable in various specific embodiments of the reaction scheme of FIG. 2, showing specific moieties that can take the place of the X in FIG. 2, as well as specific examples useable as the Y in FIG. 2.

As illustrative examples, in various embodiments, diacid chlorides that can be used in accordance with aspects of the subject innovation can include, but are not limited to: isophthaloyl chloride (IPC), terephthaloyl chloride (TPC), 2,2-dimethylmalonoyl chloride, 4,4'-biphenyldicarbonyl dichloride, azobenzene-4,4'-dicarbonyl dichloride, 1,4-cyclohexanedicarbonyl dichloride, succinyl chloride, glutaryl chloride, adipoyl chloride, sebacoyl chloride, suberoyl chloride, and pimeloyl chloride, etc.

Additionally, in various embodiments, illustrative examples of diamines that can be used in accordance with aspects of the subject innovation can include, but are not limited to: 4,4'-oxydianiline (ODA), 2,2'-dimethylbenzidine (DMBZ), 2,2-bis-[4-(4-aminophenoxy)phenyl]propane (BAPP), 3,4'-oxydianiline (3,4-ODA), 4,4'-diaminobiphenyl, methylenedianiline (MDA), 4,4'-(1,4-phenylene-bismethylene)bisaniline (BAX), p-phenylenediamine (pPDA), meta phenylenediamine (mPDA), azodianiline, 1,4-diaminonaphthalene, 1,5-diaminonaphthalene, 1,8-diaminonaphthalene, hexamethylene diamine, etc.

What follows is a more detailed discussion of certain compositions, articles, methods, materials, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups—such as choice of materials (e.g., selection of diamine(s) or diacid chloride(s), solvent(s), relative concentration of isomers, etc.), solid concentration, repeat units, etc.—the compositions, articles, and methods described herein can be employed in other contexts, as well. For example, various aspects of the subject innovation can be utilized to produce aerogels for a variety of uses terrestrial or otherwise (e.g., as insulators, as low dielectric substrates, etc.). In some embodiments, different selections of materials or formulation parameters can be selected than those used in the experiments discussed herein, and may have differing characteristics, as explained in greater detail below.

Of the materials used in experiments discussed herein, the anhydrous n-methylpyrrolidinone (NMP), m-phenylene diamine (mPDA), 1,3,5-benzenetricarbonyl trichloride (BTC), isophthaloyl chloride (IPC), and terephthaloyl chloride (TPC) were purchased from Sigma-Aldrich (St. Louis, Mo.). All reagents were used without further purification.

Thermal gravimetric analysis (TGA) discussed herein was run on a TA instruments Q500 with a ramp rate of 5° C.

per minute under nitrogen. Pycnometry discussed herein was carried out on a Micrometrics Accupyc 1340 gas pycnometer. Samples were imaged by SEM on a Hitachi S-4700 Field Emission Microscope after sputter coating the samples with platinum. Solid state 13C NMR discussed herein was performed on a Bruker Avance-300 spectrometer with cross polarization and magic angle spinning (11 kHz). The resulting spectra were externally referenced to the carbonyl of glycine (176.1 relative to tetramethylsilane). Surface area results obtained herein were measured with an ASAP 2000 surface area/pore distribution analyzer (Micrometrics Corp.) after the samples were degassed at 80° C. under vacuum for 8 hours. IR (infrared) spectra results presented herein were obtained on a Nicolet Nexus 470 FT (Fourier transform)-IR spectrometer. Measurement of dielectric properties was carried out using waveguide transmission. The effects of the n value, monomer type, and w/w % of the polymer in solution on the resulting characteristics of the aerogel materials were analyzed using Design Expert Version 8.1 (Stat-Ease Inc., Minneapolis, Minn.). Multiple linear regression analysis was employed to develop empirical models detailed below that describe the effects of these variables on properties.

In a series of experiments, BTC cross-linked polyamide monoliths were prepared to produce aerogels from the following combinations: m-phenylene diamine (mPDA)/isophthaloyl chloride (IPC), from mPDA/IPC/terephthaloyl chloride (TPC), and from mPDA/TPC. FIG. 4 illustrates a table summarizing the properties of the different polyamide aerogels studied in connection with the experiments. Monoliths of samples 6 and 12 were cracked and distorted during the drying process, and some properties could not be measured. In the experiments discussed below, gels were made from solutions of 5.0, 7.5, or 10.0% polymer by weight in NMP, using n of 20 to 40, and either IPC, TPC or a 50/50 combination of both as shown in FIG. 4, as indicated in the third column ("% para"), showing the percent of the para isomer (TPC) used, with the balance being the meta isomer (IPC). Although the samples studied focused on 0%, 50%, and 100% TPC, in various embodiments, other percentages can be used, or other diacid chlorides can be used in various combinations.

The syringe molds used in the experiments discussed herein were made by removing the needle end of a syringe, drawing the plunger to the opposite end, and lining the inside with rolled up Teflon sheet for easy removal of the monolith.

A representative procedure for an mPDA/IPC aerogel with an n value of 30 at 7.5% w/w (sample 13 in FIG. 4) is described as an example for the purposes of illustration only: A solution of mPDA (6.832 g, 63.200 mmol) in NMP (179.96 ml) was cooled to 5° C. using an ice water bath. Isophthaloyl chloride (12.414 g, 61.146 mmol) was added in one portion as a solid and the cooled solution was allowed to stir for 60 minutes. BTC (0.360 g, 1.356 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol. This was followed by seven solvent exchanges at 24 hour intervals to ensure that all of the NMP was removed from the gels. The gels, which were white and tapered at the ends, were then subjected to supercritical $CO_2$ extraction followed by drying (at 75° C.) in a vacuum oven overnight. The following FTIR and NMR results were obtained from sample 13: FTIR ($\delta$, in cm$^{-1}$): 3315 (br), 1651, 1607, 1537, 1486, 1417, 1306, 1246, 1195, 1167, 1087. Solid 13C NMR (ppm): 116.9, 129.8, 137.2, 166.1.

The procedures for making the IPC, TPC, or the 50/50 combination of PA aerogels were nearly identical. In the case of the 50% IPC/50% TPC aerogels, the calculated moles of diacid chloride needed for a given n-value were divided by two. IPC was added to the reaction mixture first and allowed to stir for 30 minutes before TPC was added. After an additional 30 minutes of stirring, the cross-linker (BTC in the experiments) was added. The combined moles of both diacid chlorides were still in an n/(n+1) ratio with the diamine. Characterization of a representative mPDA/IPC/TPC aerogel with an n value of 30 at 7.5% w/w (sample 3) is described as an example for the purposes of illustration only. The following FTIR and NMR results were obtained from sample 3: FTIR ($\delta$, in cm$^{-1}$): 3301 (br), 1650, 1607, 1537, 1486, 1419, 1306, 1251, 1167, 1091. Solid 13C NMR (ppm): 117.0, 128.5, 137.4, 165.4.

Characterization of a mPDA/TPC aerogel with an n value of 30 at 7.5% w/w (sample 11) is also described as an example for the purposes of illustration only. The following FTIR and NMR results were obtained from sample 11: FTIR ($\delta$, in cm$^{-1}$): 3315 (br), 1650, 1607, 1537, 1466, 1419, 1305, 1250, 1190, 1167. Solid 13C NMR (ppm): 118.4, 127.9, 137.2, 165.9.

Additionally, in some embodiments, aerogels of the subject innovation can be made into thin films. Of the three different types of PA aerogel studied in the experiments, the mPDA/100% IPC and mPDA/50% IPC/50% TPC types could be made into flexible, thin films, while the aerogels made using mPDA/100% TPC were brittle as thin films and broke easily. The films were made by pouring a solution prepared as previously described into a 6 inch wide doctor blade with a preset gap and casting the solution onto a polyethylene carrier film. The films, which gelled within 10 minutes, were initially tacky, but lost tackiness after soaking in ethanol for a few minutes. Afterwards, the films could be peeled from the carrier film, rolled up, and placed in clean ethanol for a day before supercritical fluid extraction.

The cylindrical monoliths were cut so that the length was 1.5 times the diameter and sanded in order to make sure that the ends were parallel. Samples made using TPC remained cylindrical throughout the gelation, solvent exchange, and drying processes. However, samples containing IPC tended to taper towards the ends of the cylinders and in several instances, also warped (n=40, 5 w/w %, sample 12) and cracked (n=20 10 w/w %, sample 6) during the solvent exchange. These samples were reshaped into perfect cylinders by centerless grinding, and the ends were cut and sanded as described above. Mechanical tests were carried out in accordance with the ASTM D695-10 method using a model 4505 Instron load frame. Young's moduli, taken as the initial slope of the stress strain curve, can be seen in FIG. 4.

Figure 5:
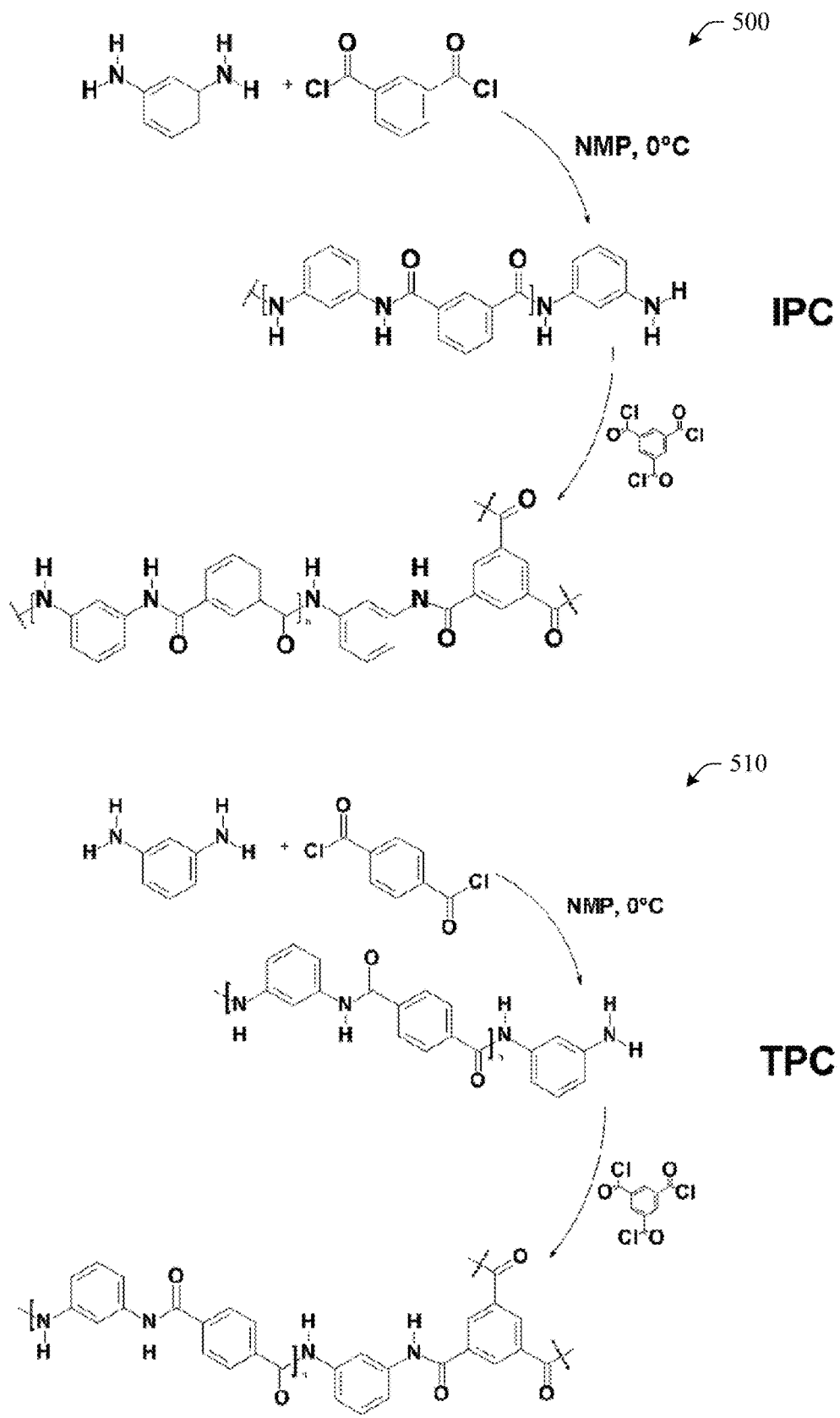
FIG. 5 illustrates reactions for the synthesis of crosslinked polyamide aerogels of the subject innovation using isophthaloyl chloride (IPC) or terephthaloyl chloride (TPC).
Figure 6:
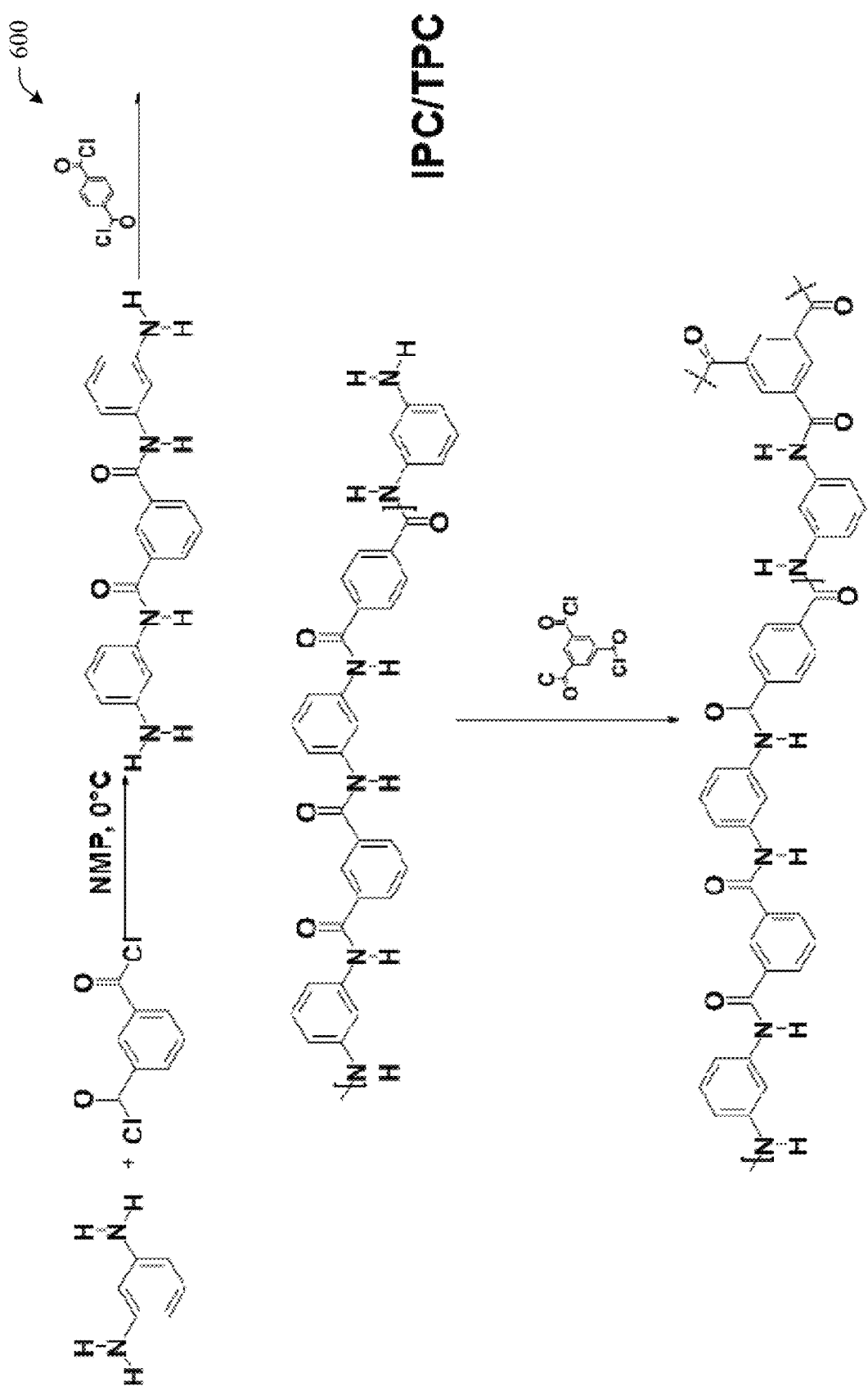
FIG. 6 illustrates a reaction for the synthesis of cross-linked polyamide aerogels of the subject innovation using both IPC and TPC.

In accordance with aspects of the subject innovation, FIGS. 5 and 6 show reaction schemes for the PA aerogels of the subject innovation. FIG. 5 illustrates reactions for the synthesis of crosslinked polyamide aerogels of the subject innovation using a meta diacid chloride (IPC) at 500 and a para diacid chloride (TPC) at 510, and FIG. 6 illustrates a reaction for synthesis using both diacid chlorides (IPC and TPC) at 600. As shown in FIGS. 5 and 6, the three different types of amine terminated oligomers studied in the experiments can be made via low temperature condensation reactions between mPDA, and either, IPC, TPC, or a 50/50 combination of TPC and IPC, as shown in FIG. 4. These dicarbonyl moieties can be varied in order to generate different species with differing degrees of para substitution in their backbones (three were explored in the experiments), to explore the effect of meta or para substitution on the properties of the aerogels. In reaction 500, the reaction to produce IPC based oligomers is shown. At low temperatures, meta substituted phenylene diamine mPDA can be reacted with meta substituted isophthaloyl chloride (IPC) at low temperatures in NMP to form a solution of oligomers with meta substitution at every moiety along the backbone. Addition of the cross-linker, BTC in the experiments, at low temperatures can induce gelation of this mixture within 5 minutes. Similarly, the reaction scheme 510 for TPC based aerogels shows the low temperature reaction of mPDA, but with the para substituted terephthaloyl chloride (TPC) in order to make a solution of oligomers where half of the backbone moieties had a linear and rigid para substitution pattern. Like the IPC containing species, addition of the cross-linker (BTC) caused gelation within 5 minutes.

Reaction 600 shows the formation and cross-linking of the IPC/TPC PA aerogel. Although two separate steps are shown for the oligomerization stage, this process occurs as a "one pot" reaction. The order of addition and timing with which this reaction occurs is worth noting. First, mPDA can be reacted with isophthaloyl chloride and at this stage of the reaction, only half of the acid chloride required for reaction completion has been used. Therefore, the majority of the reaction mixture becomes short (n=1) meta substituted oligomers with amine end caps. The other half of the calculated amount of acid chloride required for reaction completion can then be added to this mixture in the form of para substituted terephthaloyl chloride to make a PA species that has regularly occurring para substituted moieties along its backbone but to a degree that is in between that of the IPC and TPC only formulations.

Other variables examined in the experiments included polymer concentration (which was varied between 5, 7.5 and 10 w/w %) and the number of formulated repeat units, n, in the oligomers (which was varied between 20 and 40). This was accomplished by using n di-acid chlorides combined with n+1 total diamines, as shown in the scheme of FIGS. 5 and 6. The range of n was chosen because oligomers formulated with n>40 resulted in no gelation after addition of BTC while n<20 oligomers gelled too quickly after addition of BTC.

Figure 7:
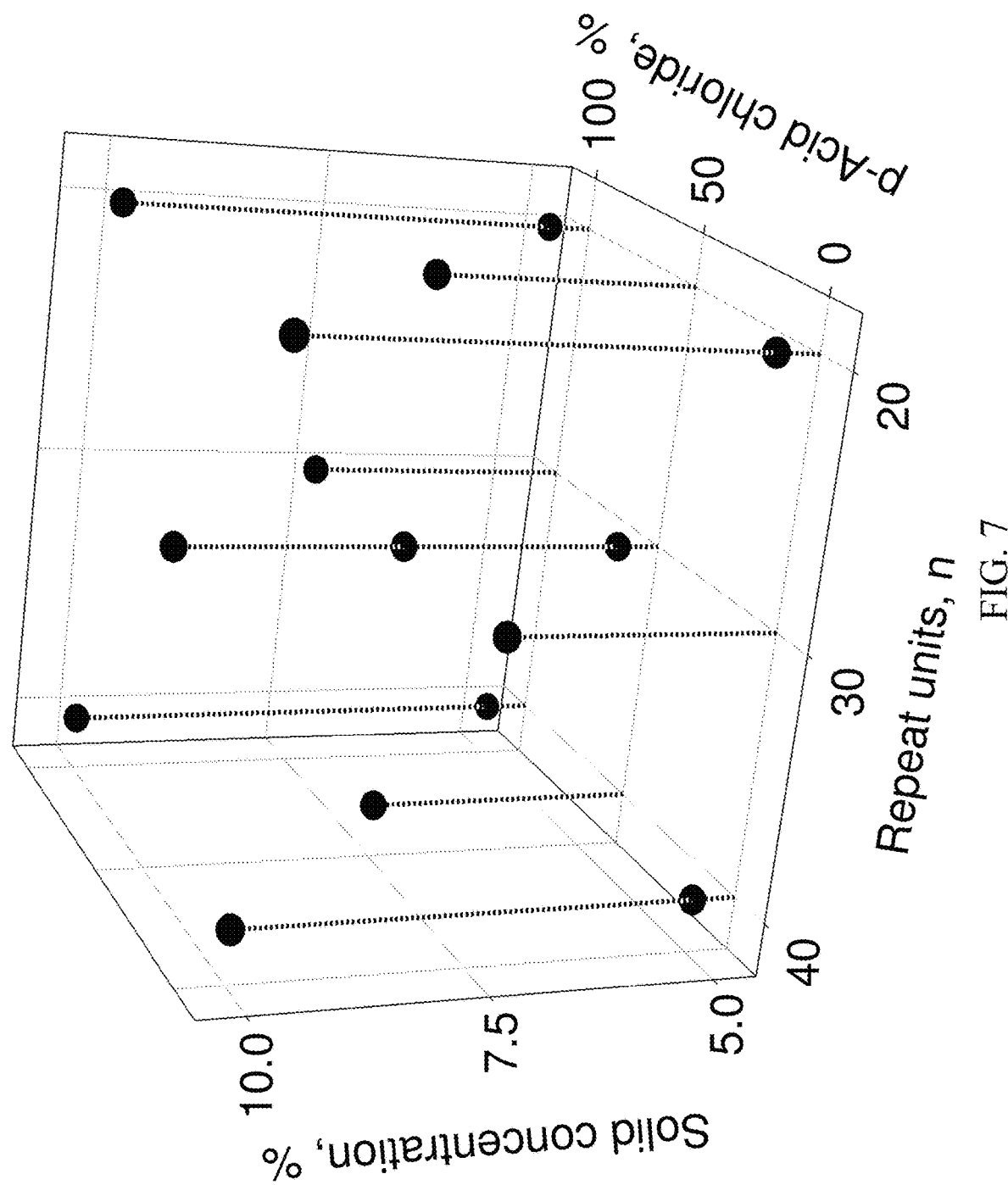
FIG. 7 illustrates representation of the face centered central composite design employed to minimize the number of experiments necessary to understand the relationship between the three variables and the resulting properties in experiments discussed herein.

FIG. 7 illustrates the representation of the face centered central composite design employed to minimize the number of experiments necessary to understand the relationship between the three variables and the resulting properties, showing fifteen different combinations of variables used in the synthesis of aerogels during the experiments. The middle point was repeated 4 times in order to assess model reliability and accuracy. The nineteen experiments outlined in FIG. 4, along with the corresponding measured data, were used to create empirical models presented herein. A full quadratic model for each measured response was entertained, including all two way interactions between variables. Using backward stepwise regression to eliminate insignificant terms allowed derivation of empirical models for all measured properties related to the variables studied.

Figure 8:
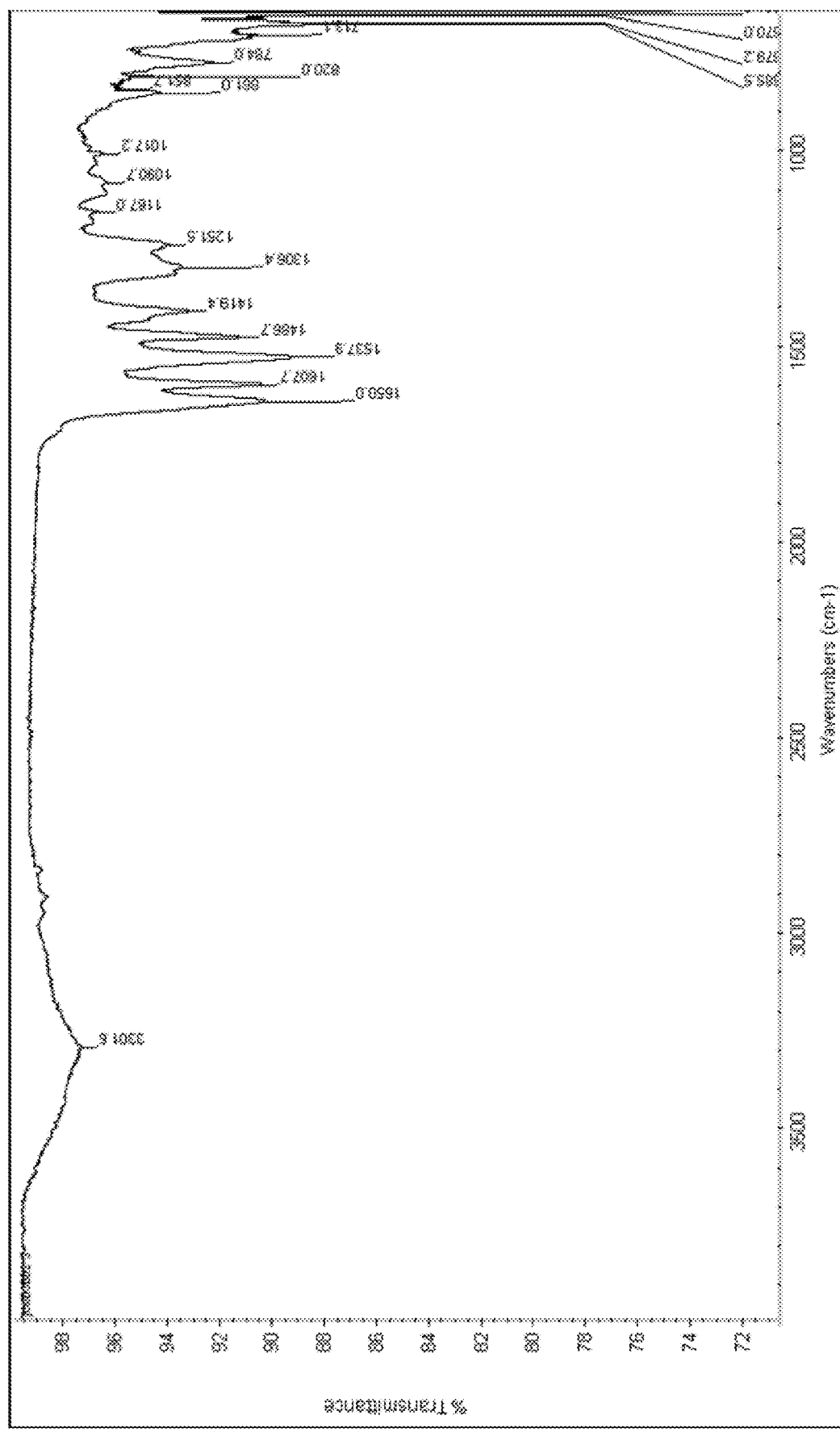
FIG. 8 illustrates an example IR spectrum of a polyamide aerogel showing its diagnostic peaks.

FIG. 8 illustrates a representative example FT-IR spectrum of an IPC/TPC containing aerogel (sample 3, 7.5 w/w %, n=30), showing its diagnostic peaks. All PA aerogels produced in the experiments, regardless of acid chloride used, showed the same characteristic peaks, including peaks at 3315 cm$^{-1}$ (s, amide bending, N—H), 1649 cm$^{-1}$ (s, amide, C=O), and 1537 cm$^{-1}$ (s, amide, N—H). The absence of any peaks or shoulders in the range of 1700-1750 cm$^{-1}$ indicates that there was no remaining unreacted carboxylic acid and that no esters were formed between the reaction of unreacted acid chlorides and ethanol during the solvent exchange step.

Figure 9:
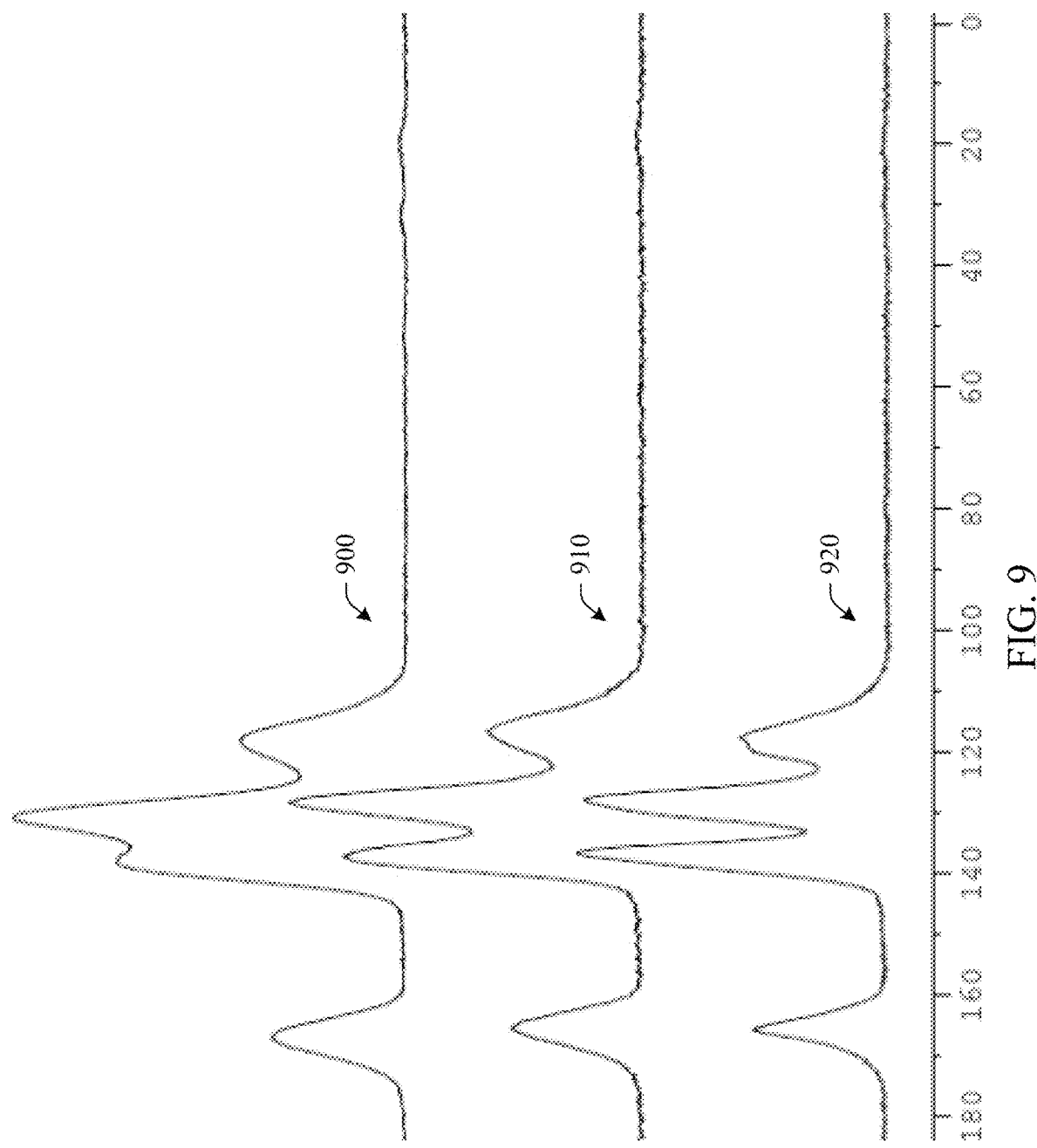
FIG. 9 illustrates $^{13}C$ CP-MAS NMR spectra for an example IPC based aerogel, an example IPC/TPC based aerogel, and an example TPC based aerogel

FIG. 9 illustrates $^{13}$C CP-MAS NMR spectra for an example IPC based aerogel at 900, an example IPC/TPC based aerogel at 910, and an example TPC based aerogel at 920. All three spectra contain a peak at 166 corresponding to the amide carbonyl, as expected, and a peak at 137 for the aromatic carbons substituted with amine or carbonyl. The aromatic peaks corresponding to BTC cross-linker in all three spectra are anticipated to be small and overlap with the aromatic peaks arising from the aromatic rings of the oligomers. Spectrum 900 is of an IPC containing aerogel (Sample 13, 7.5 w/w %, n=30) and has two other aromatic peaks at 116.9 (carbons next to the amines) and 129.8 (other unsubstituted aromatic carbons). Spectrum 920, which is of a TPC containing (Sample 11, 7.5 w/w %, n=30) aerogel, also has two other peaks at 118.4 (carbons next to amines) and 127.9 (other unsubstituted aromatic carbons). Though very similar, the carbons next to amine in the TPC aerogel are shifted slightly higher compared to those of IPC, while the other unsubstituted carbons are shifted slightly lower. Spectrum 910 is of an aerogel made with a 50/50 blend of IPC and TPC (Sample 3, 7.5 w/w %, n=30) and displays an intermediate shift of the two carbon peaks, allowing differentiation between the three distinct backbone chemistries.

Figure 10:
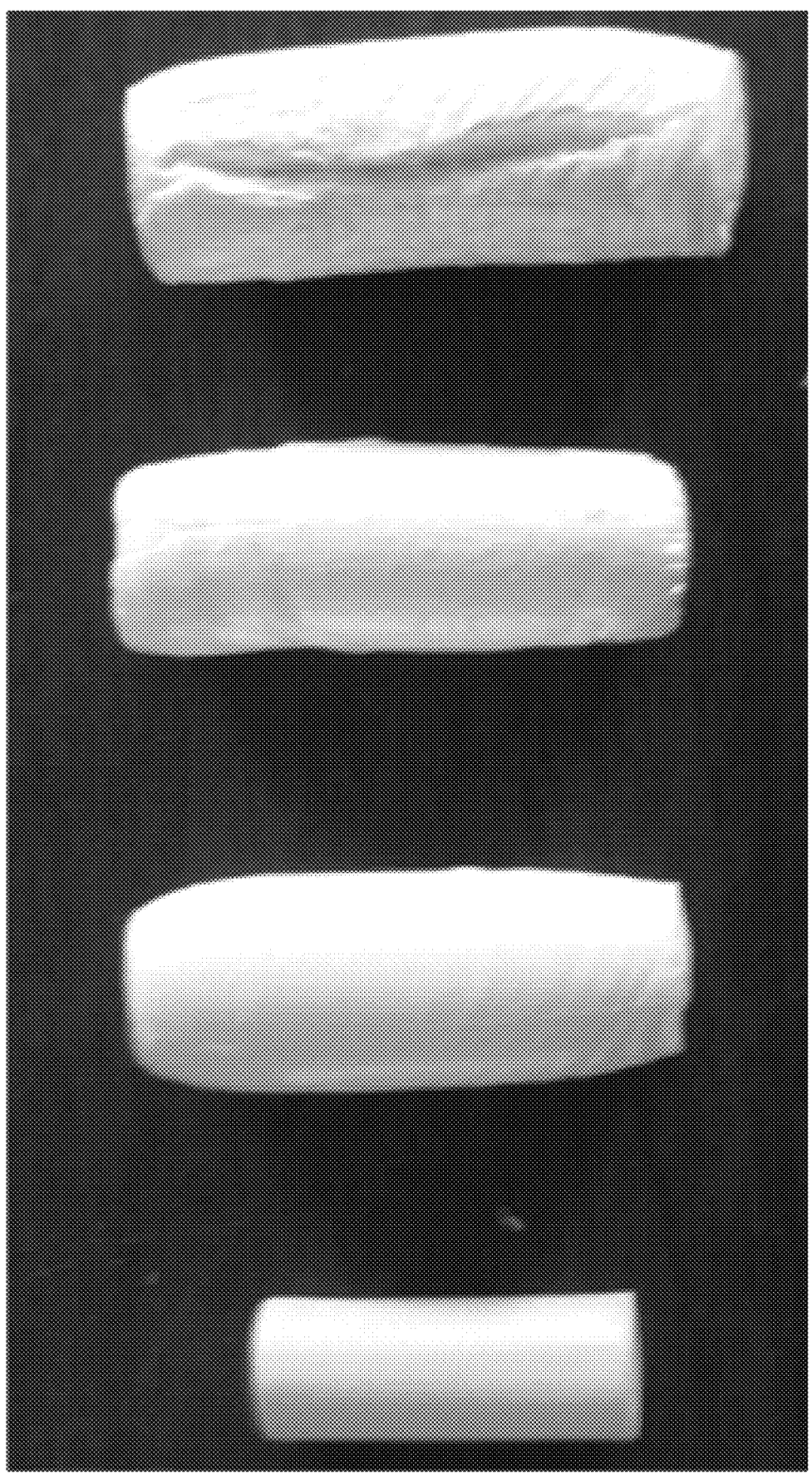
FIG. 10 illustrates example polyamide aerogel monoliths from the experiments discussed herein.

FIG. 10 illustrates, from left to right, a TPC based aerogel (sample 11, 7.5 w/w %, n=30), an IPC/TPC sample (sample 3, 7.5 w/w %, n=30), an IPC based aerogel with visible surface distortions (sample 13, 7.5 w/w %, n=30), and one of the two cracked/distorted IPC based aerogels (sample 6, 10 w/w %, n=20). Samples 11, 3, and 13 are typical of all those in the study made with similar backbone structures. Gels made using TPC as the only acid chloride tended to become cloudy during cross-linking and gelation. Certain TPC gels with higher polymer w/w % and n had to undergo shorter reaction times (20 minutes) prior to the addition of the cross-linker, since gelation occurred rapidly even without adding cross-linker. TPC based gels also did not shrink or swell during gelation. This was in contrast to formulations containing IPC (50 or 100%), which remained clear and swelled slightly in NMP, requiring that the mold used to form the cylindrical monolith be lined with a Teflon sheet to ease removal from the mold.

Gels based only on TPC underwent shrinkage during solvent exchange and supercritical drying, but did so uniformally during this process as seen in FIG. 10 (left, Sample 11, 7.5 w/w %, n=30). The monoliths of the 50% IPC based materials did not shrink uniformly, but tapered at the ends, and developed a skin during solvent exchange (Sample 3, 7.5 w/w %, n=30). Formulations using 100% IPC (Sample 13, 7.5 w/w %, n=30), as shown in FIG. 10, also formed a skin and in most cases were similar in appearance to those using 50 IPC. However, those made with a combination of n=20 and 5 wt % polymer as well as n=40 and 10 wt % polymer, such as samples 12 and 6 in FIG. 4, respectively, also tended to warp, crack, and blister during the solvent exchange process (e.g., sample 6 on the right of FIG. 10, with 10 w/w %, n=20).

The uniform shrinkage that occurred during processing with the TPC derived aerogels was not an unusual observation. Some degree of shrinking is observed in nearly all aerogels, whether they are organic or inorganic. This sort of uniform volume change is not unheard of in aerogel processing and is often attributed to factors such as chain relaxation and macro-syneresis. However, the non-uniform shrinkage, development of a skin, or warping and cracking observed in IPC derived aerogels have not been commonly reported. While information concerning the behavior of cross-linked aramid gel networks in swollen and non-swollen states interacting with different solvents is scarce, there are studies concerning the general behaviors of other well solvated networks and the types of syneresis that occurs when contacting non-solvents. Furthermore, there are several studies carried out on the swelling and deswelling behaviors of polymeric hydrogels bearing pendant amide moieties when exposed to non-solvents. These behaviors are commonly linked to macrosyneresis (if the sample undergoes shrinkage at the macroscale) or micro-syneresis (if the sample maintains its overall shape and size but undergoes pore size broadening).

While micro- and macro-syneresis are typically discussed as phenomena that arise from the interactions between a solvent and a growing oligomer during polymerization, they are not often discussed as contributing factors leading to variations in pore structure after cross-linking and gelation. However, during numerous studies on the swelling and deswelling behaviors of gelated polyacrylamide networks, a prior study qualitatively identified the cause of some observed inhomogenieties in cylindrical gel samples as arising from microsyneresis. It was found that when a cylindrical gel sample that was swollen suddenly encountered a non-solvent, the parts of the sample in immediate contact with the non-solvent underwent a segregation into solvent-rich and polymer-rich regions forming an outer layer that underwent deswelling, while the inner core of the cylinder remained desegregated. If the polymer rich region of the outer layer of the sample was in a glassy state, it could block or hinder diffusion to the inner part of the sample. This prevented or slowed the sample from coming to equilibrium with the non-solvent that it was soaking in, and stabilized the heterogenous structure that formed as a result of contact with the non-solvent.

It can be inferred, then, that the inhomogeneity observed in the IPC containing species arose due to similar phase segregation processes. As evidenced by the fact that the undried IPC containing gels expanded to a diameter larger than the molds during removal, they were in a swollen state before undergoing solvent exchange. The observed rounding of the sample ends arose from an outer layer that underwent rapid deswelling and segregation upon contact with a non-solvent, while the inner core exchanged more slowly and uniformally, undergoing a less drastic shrinkage. Examination of the cross sections of the supercritically dried products confirmed the presence of this different region as a narrow band extending a few millimeters in from the surface.

Figure 11:
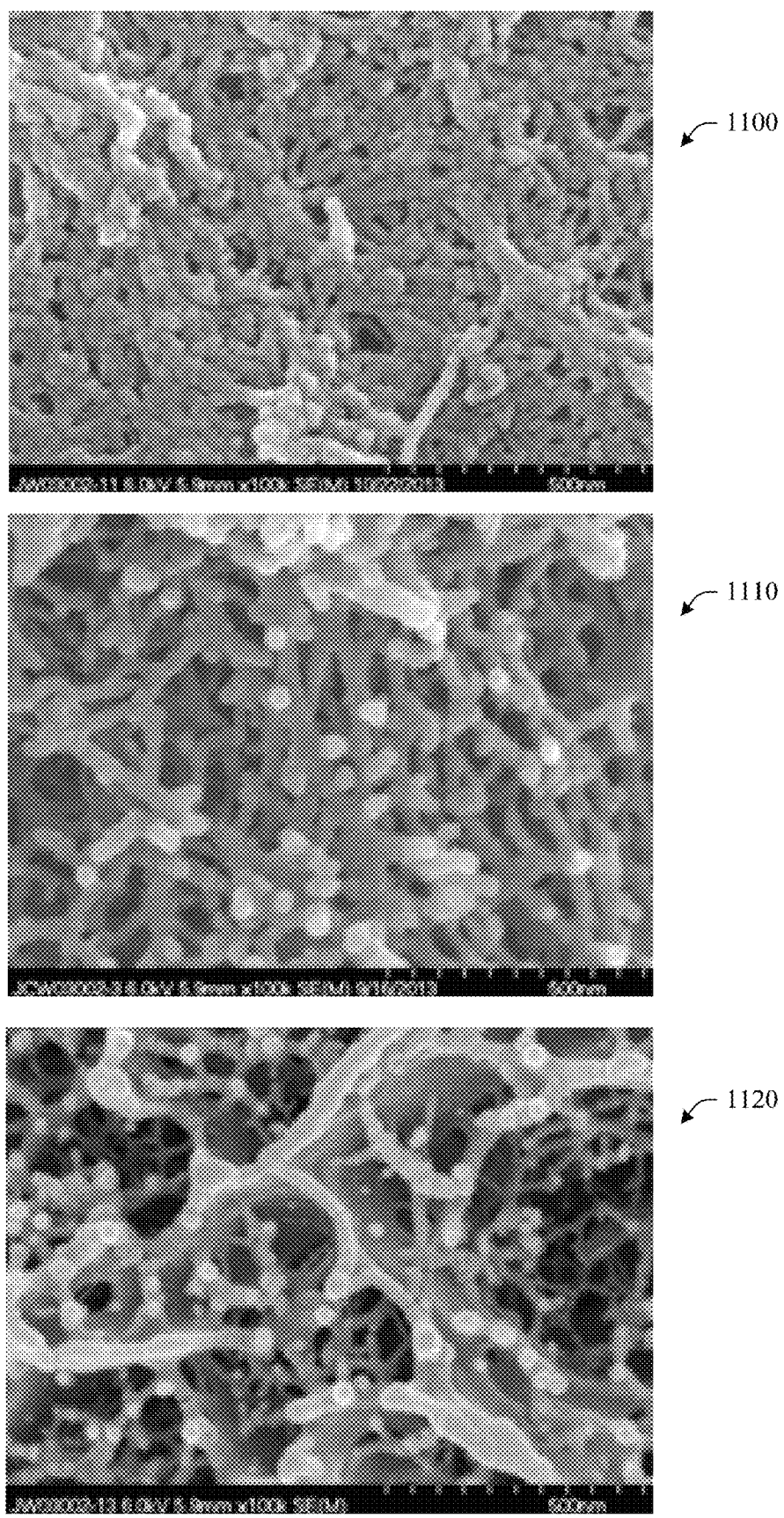
FIG. 11 illustrates a comparison of SEMs of a TPC based aerogel with SEMs of an IPC/TPC based aerogel and an IPC based aerogel.

The occurrence of this form of syneresis, or polymer/solvent segregation, was consistent with comparison of the IPC and TPC containing species by SEM. FIG. 11 illustrates a comparison of SEMs of TPC based aerogel 1100 (sample 11, 7.5 w/w %, n=30) with SEMs of an IPC/TPC based aerogel 1110 (sample 3, 7.5 w/w %, n=30) and an IPC based aerogel 1120 (sample 13, 7.5 w/w %, n=30), with evidence of polymer/solvent phase segregation in 910 and 920. Sample 11, with SEM shown in 1100, underwent no distortion, shrank uniformly, and had a morphology more uniform in appearance, consisting of a homogeneous 3D network comprising fine, separated strands.

In contrast, a representative sample derived from 100% IPC (sample 13, 7.5 w/w %, n=30) was much less uniform, as shown at 1120. These samples had a hierarchical porosity arising from the partial coalescence of the fine structure into polymer rich walls that surround areas of finer structure. At 1110 is a 50/50 formulation, which did not have the obvious segregation of the pure IPC sample but did not have a more open pore structure than the TPC sample.

Figure 12:
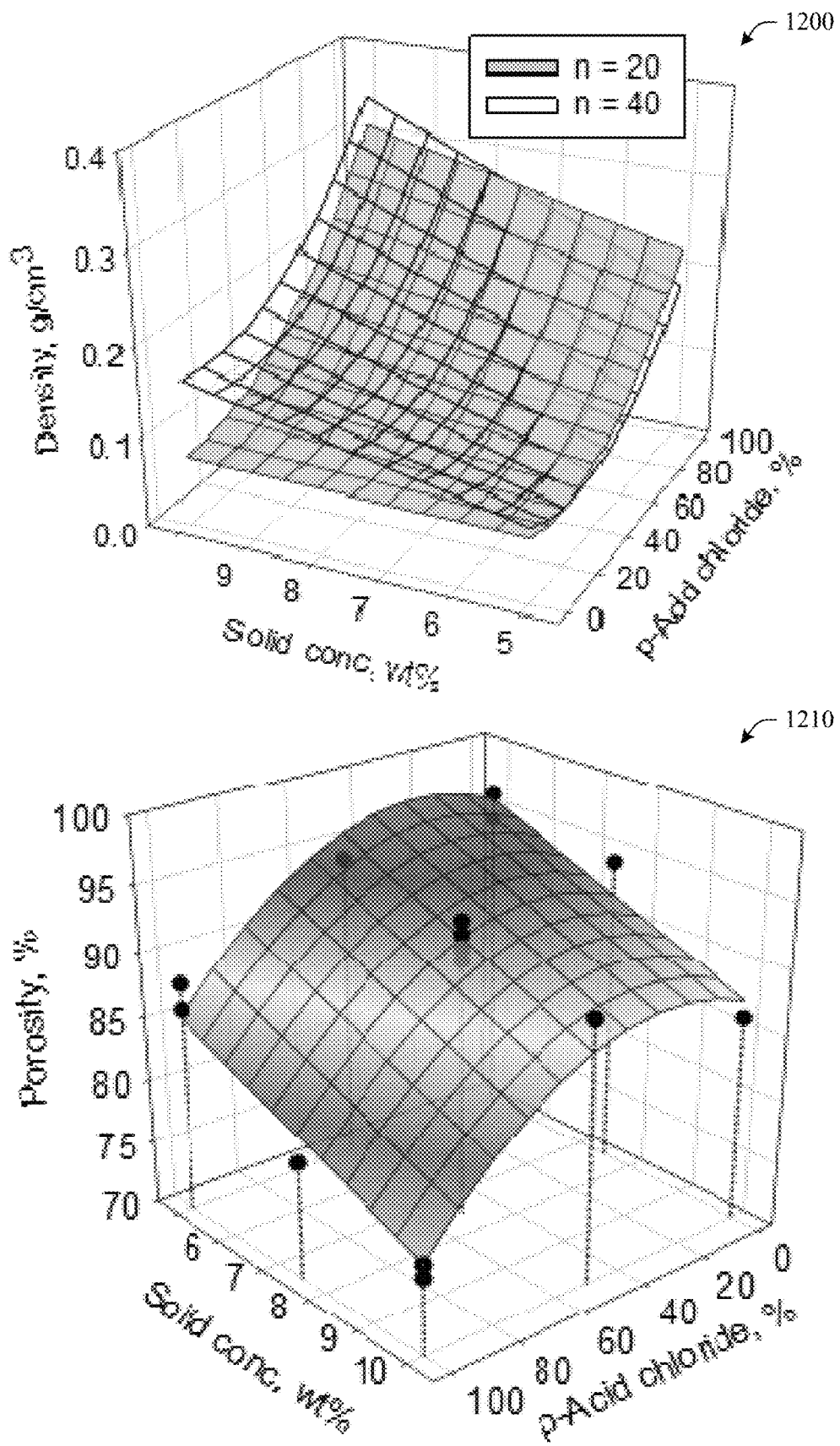
FIG. 12 illustrates empirical models for density and porosity in connection with polyamide aerogels of the subject innovation.

As seen in FIG. 12, illustrating empirical models for density (Standard deviation=0.014, $R^2$=0.98) at 1200 and porosity at 1210, the degree to which a particular sample shrank was also readily apparent when modeling the densities and porosities. Typically, it is expected that polymer concentration would have a large effect on the final density of the aerogel. In the subject experiments, there was a significant effect of polymer concentration, but it was small in comparison to the effect of the amount of TPC used in the aerogel synthesis. Aerogels fabricated using IPC, while undergoing more distortion as already discussed, generally shrank less, resulting in lower densities. Aerogels derived from TPC had higher densities since they experience more, though uniform, shrinkage.

This held true for all three monomer combinations, with a wide range of densities (0.06-0.33 $g/cm^3$) observed simply by varying the fraction of TPC used and the polymer concentration. It was also found that the n-value of the systems, and by extension the cross-link density, had less of an impact on the overall density of the systems, as seen at 1200. Interestingly, these same two factors, w/w % and monomer type, also had the greatest influence on the porosity of these materials. However, with increasing w/w % and para acid chloride fraction, the porosity decreased (Standard deviation=1.71, $R^2$=0.93), creating an overall inverse relationship between density and porosity. A material that is generally found to be less dense will tend to have a higher porosity.

Figure 13:
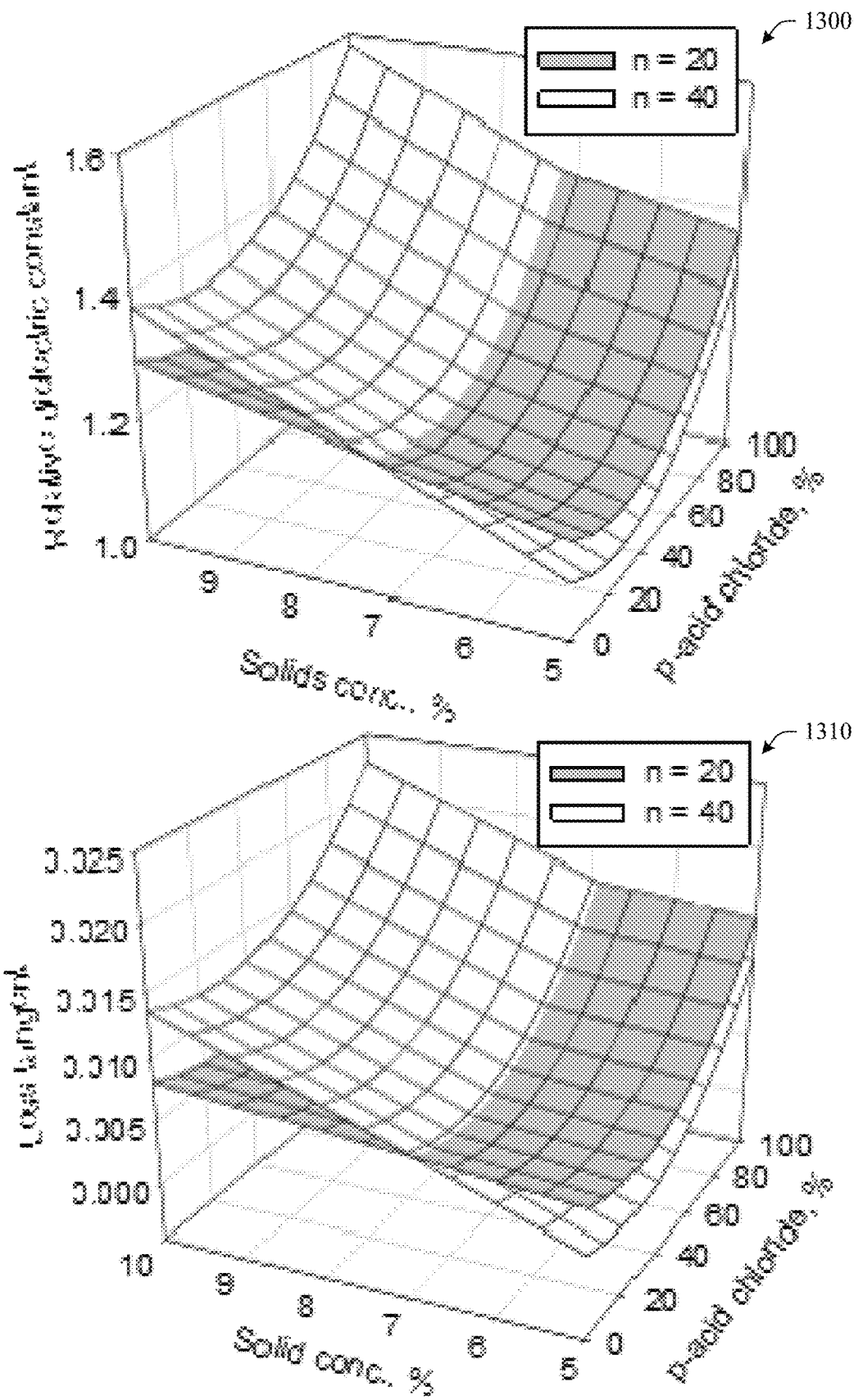
FIG. 13 illustrates the empirical model for the dielectric measurements in connection with polyamide aerogels of the subject innovation.
Figure 14:
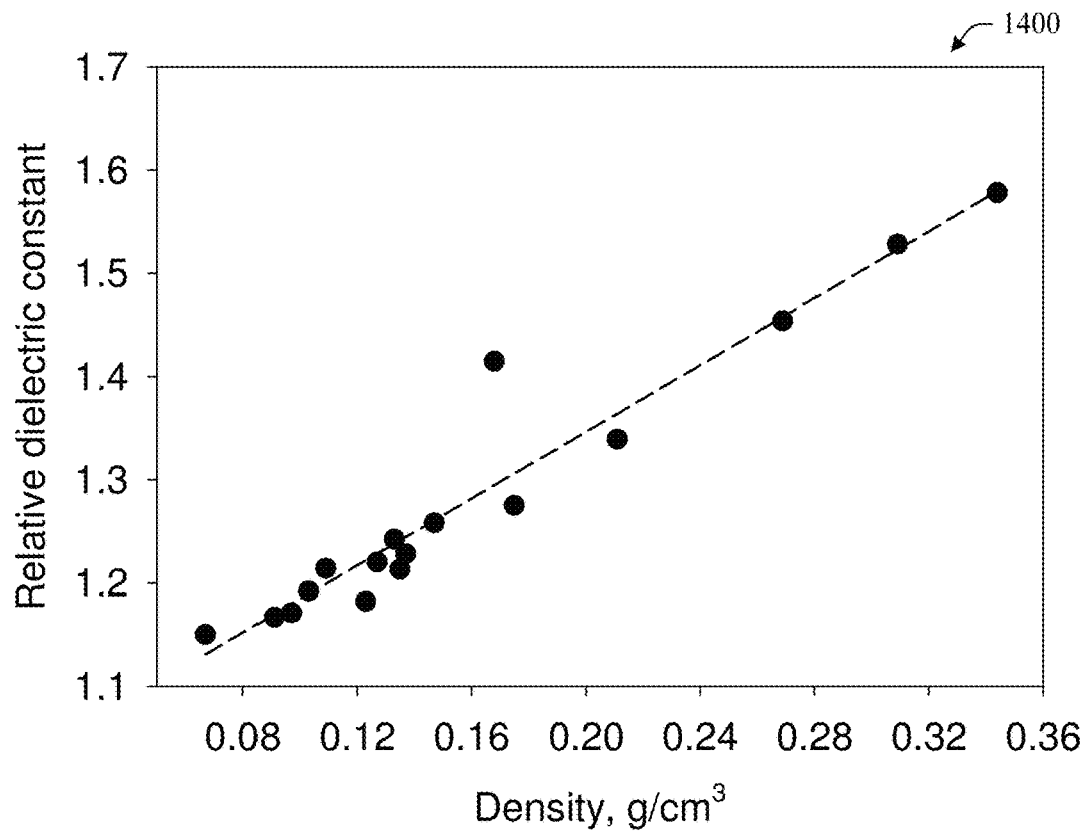
FIG. 14 illustrates graphs of density versus relative dielectric constant and density versus loss tangent in connection with polyamide aerogels of the subject innovation.
Figure 14:
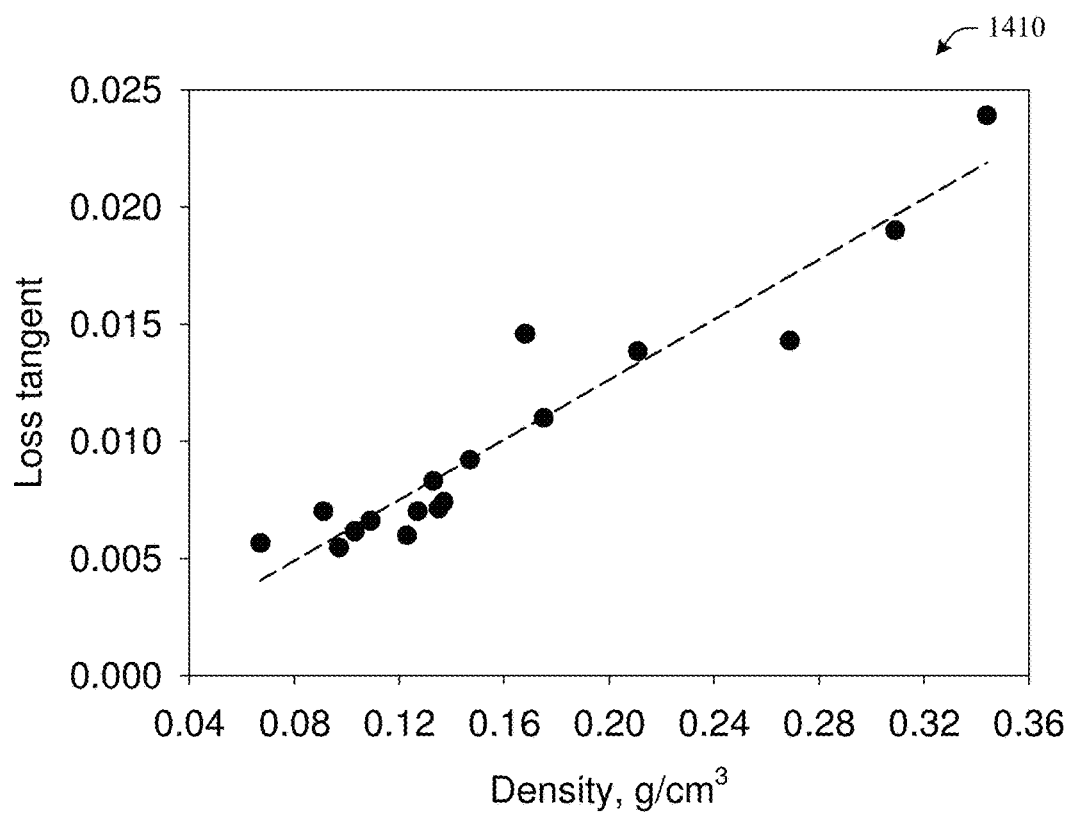

It is known that the dielectric constant of an aerogel tends to be closely linked with its density and that higher densities give rise to higher dielectric constants and vice versa. Polyamide (PA) aerogels are no exception to this observation. Like density, the dielectric constants of these materials were dependant on the w/w % of polymer in the formulation, as well as the ratio of TPC to IPC in the formulation. FIG. 13 illustrates the empirical model for the dielectric measurements (Standard Deviation=0.042, $R^2$=0.92) (with relative dielectric constant at 1300 and loss tangent at 1310), which was very similar to the model found for density. FIG. 14 shows graphs of density versus relative dielectric constant at 14200 and density versus loss tangent at 1410, revealing a linear relationship between the density and dielectric constant.

At lower densities, dielectric constants as low as 1.15 (x-band) were observed, making these materials comparable to polyimides, which are drawing interest as substrates for patch antennae. The polymer w/w % of the formulations and monomer identities play the largest roles in determining the magnitude of the dielectric constants, but empirical modeling shows that, like density, the n-value of the oligomers also plays a role, albeit a minor one. In general, increasing the n-value of a formulation slightly elevates the loss tangents and dielectric constants at high polymer w/w %. Conversely, the loss tangents and dielectric constants are slightly diminished at low polymer w/w % when the n-value is high. The opposite of this relationship holds true for lower n-values. The lowest loss tangent of 0.0056 (n=20, 5 w/w %, 0% TPC) occurs at the lowest n-value, w/w % and TPC fraction while the highest loss tangent (n=40, 10 w/w %, 100% TPC) occurs at the highest n-value, w/w % and TPC fraction. Where with other aerogel species, the loss tangents could not be correlated with density, and by extension the dielectric, polyamides show well behaved linear relationships between loss tangent and density, as seen at 1410.

Figure 15:
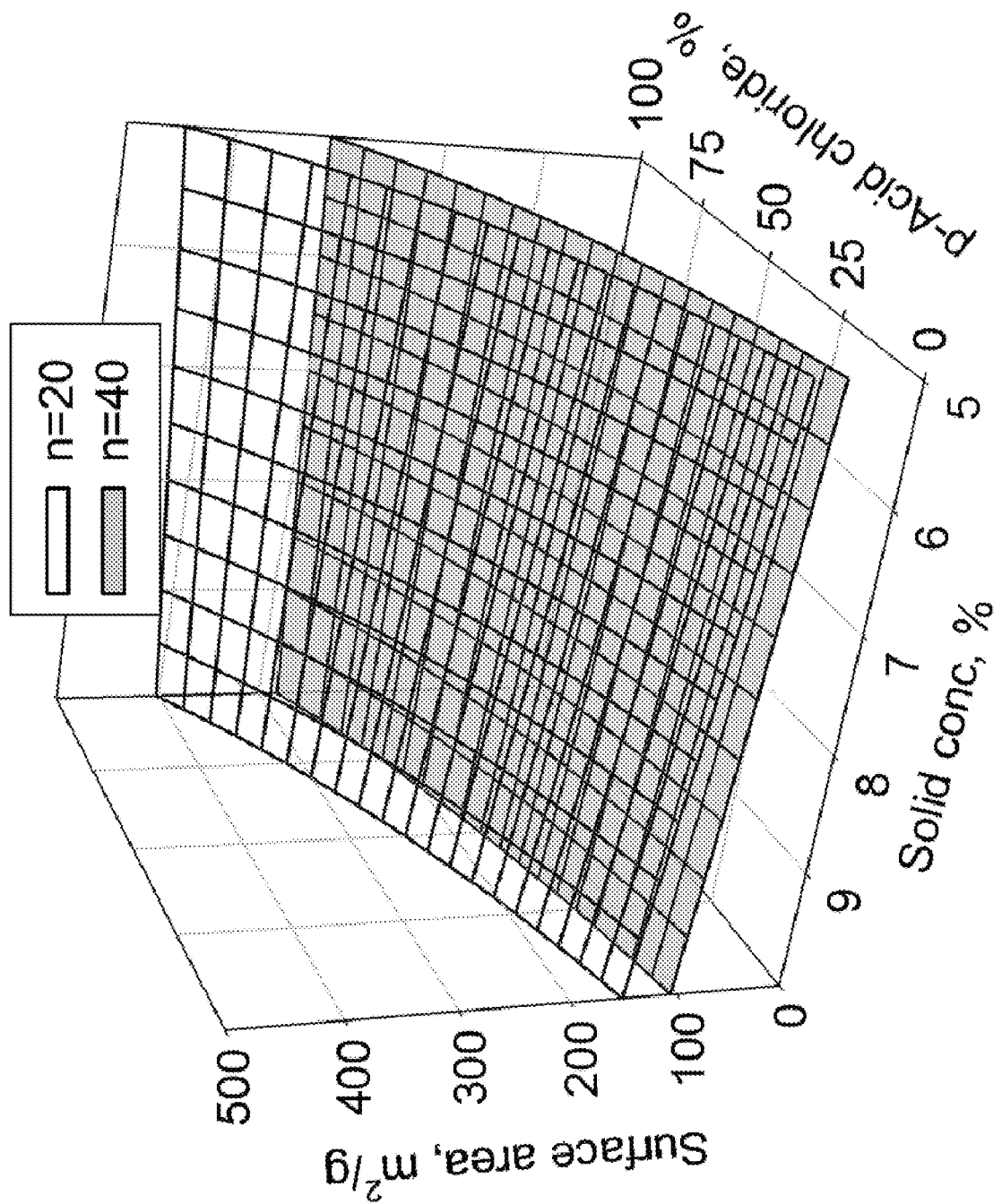
FIG. 15 illustrates the empirical model for surface area in connection with polyamide aerogels of the subject innovation.

Measurements of the surface areas using BET (Branuaer-Emmet-Teller) revealed a wide range among the samples (48-366 $m^2/g$). Like density and the dielectric constant, the surface areas of PA aerogels were significantly influenced by the n-value of the formulation. In general, lower n-values gave higher surface areas. The dominant factor however, was still the fraction of para acid chloride used to form the polyamide backbone. As shown in FIG. 15, illustrating the empirical model for surface area (Standard deviation=34.6, $R^2$=0.88), changes in this parameter (fraction of para acid chloride) can affect surface areas by hundreds of square meters per gram. The interaction between n-value and monomer identity remains the same at all three w/w % s studied, indicating that the w/w % of the formulation is not a dominant factor in the surface areas of these materials.

This is illustrated by the dominant role that the terephthaloyl chloride fraction, or lack thereof, had in determining the surface area of PA aerogels. Formulations using little or no terephthaloyl chloride had a higher degree of conformational freedom in the oligomer chain, and less rigidity, allowing for greater chain solubility during the gelation phase. This solubility accounted for the observed deswelling induced syneresis which, as discussed earlier, played a prominent role in the variation of porosities, densities and surface areas that occur as terephthaloyl chloride was incrementally replaced with isophthaloyl chloride in these formulations. As the high surface area 3D structure of the predominantly meta systems underwent segregation into polymer and solvent rich phases during solvent exchange, larger pores were created, decreasing the surface area in order to form the walls of the larger pores of the hierarchical pore structure. The net effect was that high porosity and low density were maintained at the expense of surface area. This was in contrast to samples that had none of the meta substituted isophthaloyl chloride. The rigidity of these polymer systems disallowed for reorganization on a local scale since they were not transitioning from a swollen to deswollen state during solvent exchange. Therefore, all that was observed is shrinkage at the macroscale. The net effect was that the material shrinks uniformally, surface area was maintained, density increased, and porosity was diminished.

Figure 16:
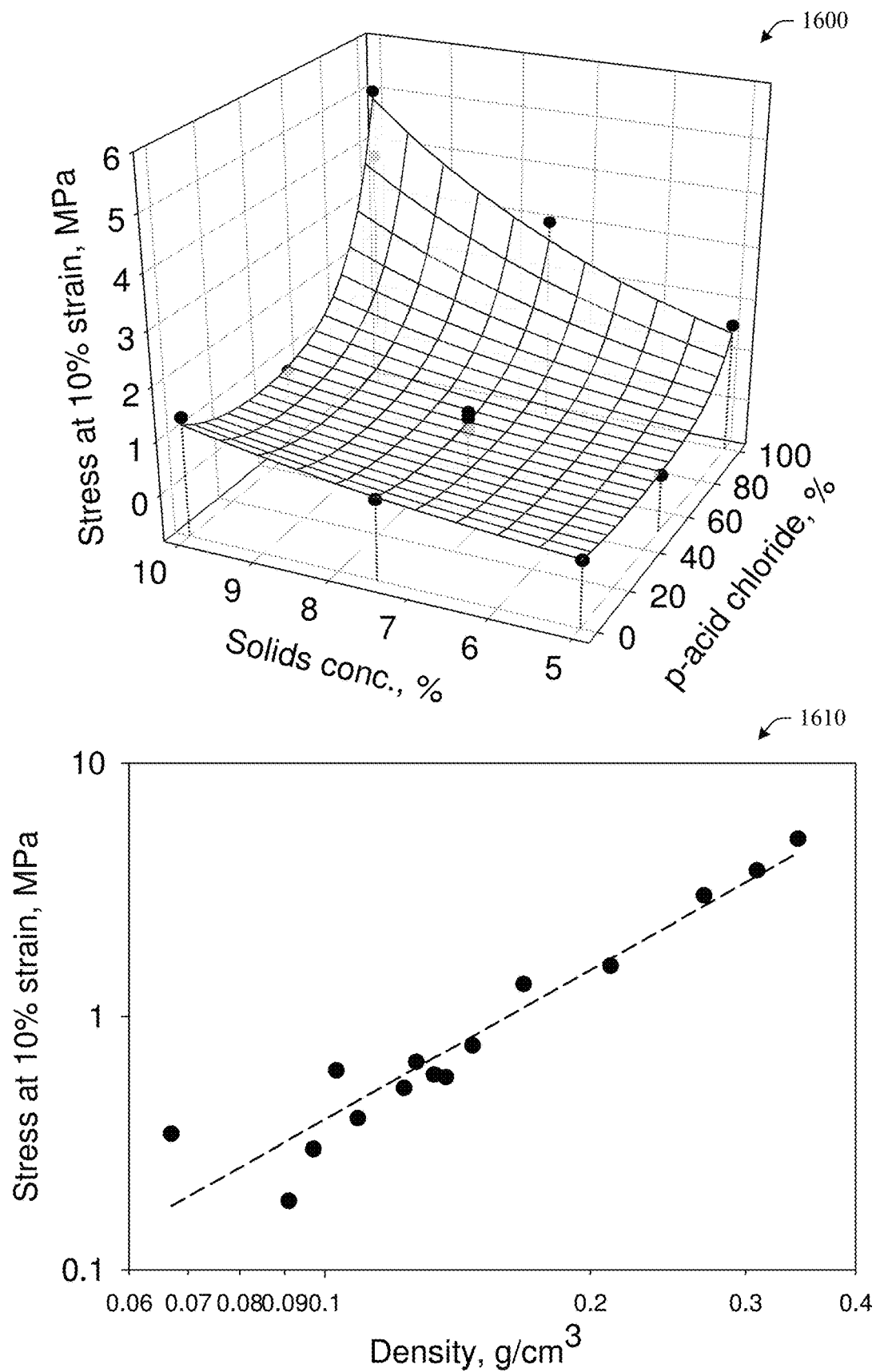
FIG. 16 illustrates the empirical model for compressive strength and a plot of stress at 10% strain against density in connection with polyamide aerogels of the subject innovation.

In FIG. 16, the empirical model (log standard deviation=0.11, $R^2$=0.95) for the compressive strengths of all the monoliths studied is shown at 1600, and a plot of stress at 10% strain vs. density is shown at 1610. The materials of the subject innovation do not behave like glasses or metals in that they do not undergo a failure by shattering during compression testing. What occurs is that the testing apparatus continues to apply compressive stress until the cylinder is flattened to a disk and the load cell reaches its maximum applied force with no fracture event being observable. Therefore, any statements made about the overall compressive strength of the materials are arbitrary, meaning that the compressive strength should be discussed at a specified value of strain that would indicate complete failure of a material for a given application. Since compressive strength is not a fundamental value of materials that do not undergo fracture it is customary to report it at a deformation level of 1% or 10%.

Model 1600 reveals a strong interaction between the formula w/w % and substitution pattern of the dicarbonyl moieties in the backbone. However, no significant impact by the n-value could be detected on the strength of these materials during compression. In instances where both IPC and TPC were used in even amounts, the compressive strength was minimal. In instances where only isophthaloyl chloride was used as the dicarbonyl and the formula w/w % were high, there was a noticeable increase in compressive strength. However, the most obvious influence on compressive strength arose from the materials relying on only the TPC moiety. Not surprisingly, these were the same materials that underwent uniform shrinkage and had higher densities than their counterparts that contained elevated fractions of isophthaloyl moieties. In fact, a linear relationship between density and compressive strength was evident, as seen at 1610.

Figure 17:
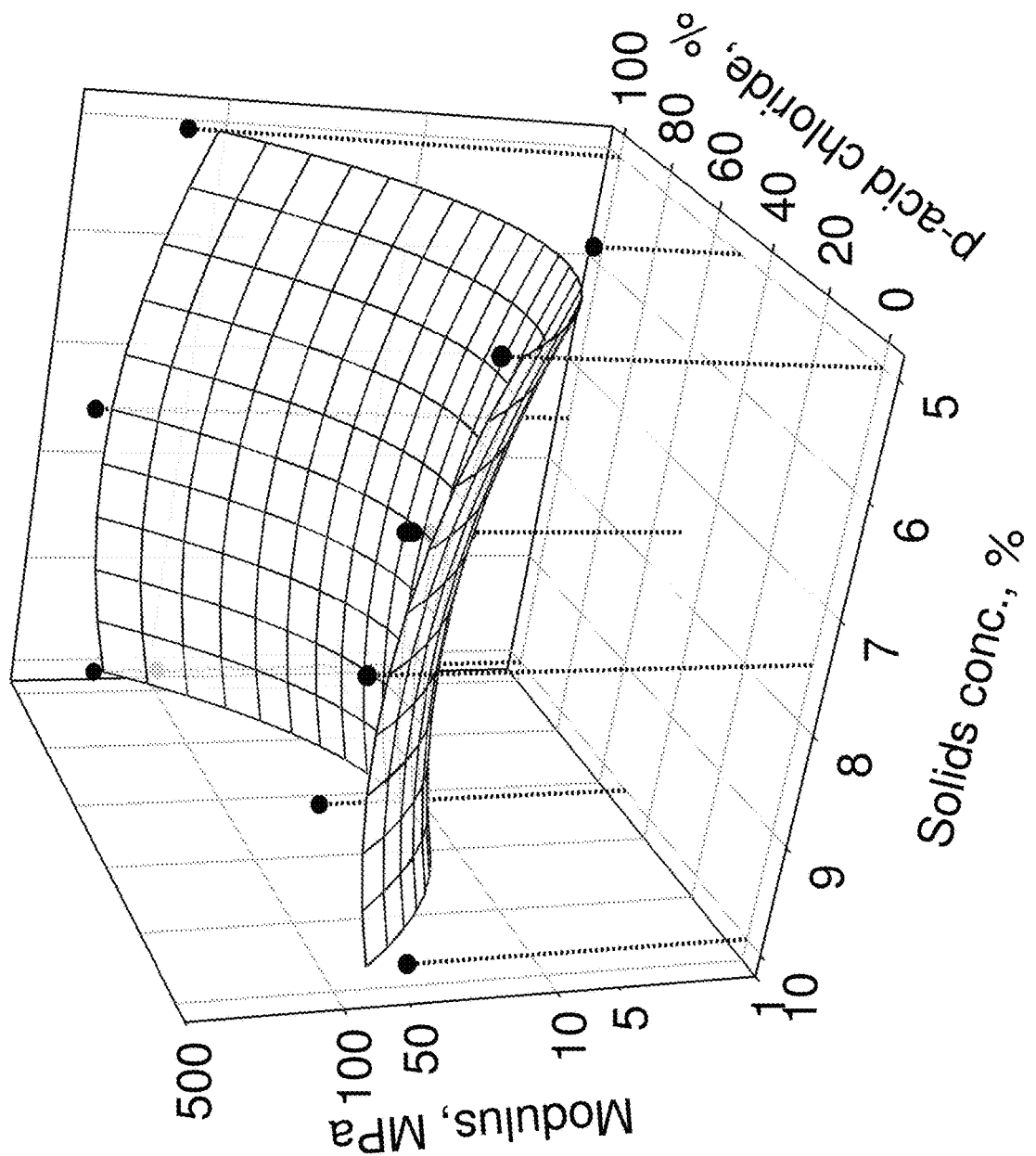
FIG. 17 illustrates the empirical model for the Young's moduli in connection with polyamide aerogels of the subject innovation.

While the lack of fracture events during mechanical testing precluded any discussion of the ultimate strengths of these materials, it is possible to discuss their rigidity, or Young's moduli, in much more specific terms. FIG. 17 illustrates the empirical model (log standard deviation=0.22, $R^2$=0.86) for the Young's moduli measured for the formulations that provided samples suitable enough for mechanical testing. The values are shown in the logarithmic scale with the highest belonging to those using only TPC as their dicarbonyl source. It can be expected that the TPC containing formulations would be the strongest for a combination of two reasons. First, a high degree of para substitution allows for more optimal intermolecular hydrogen bonding. Second, the more linear sections of an aromatic PA allow for additional strength through aromatic stacking interactions. Polyamides that have more randomized structures, such as those using a mix of diamines or diacid chlorides, like the IPC/TPC containing formulations, tend to not be as strong since the irregularity of the chains disrupts stacking as well as hydrogen bonding. This is evident in the model of FIG. 17 when examining the Young's modulus of any material that utilizes both types of dicarbonyl. These formulations had the lowest moduli of all three polymer species examined.

The materials utilizing only IPC and mPDA however, still had the capacity to undergo hydrogen bonding, but not to the degree that the TPC based materials did. Furthermore, every repeat unit was composed of meta substituted monomers, giving the polymer chain a completely kinked structure and preventing the coplanar stacking of the aromatic rings. For this reason, the heavily meta substituted aerogels utilizing only IPC (47-125 MPa) were weaker than their TPC (100-312 MPa) counterparts but stronger than those using both IPC and TPC (5-40 MPa).

Figure 18:
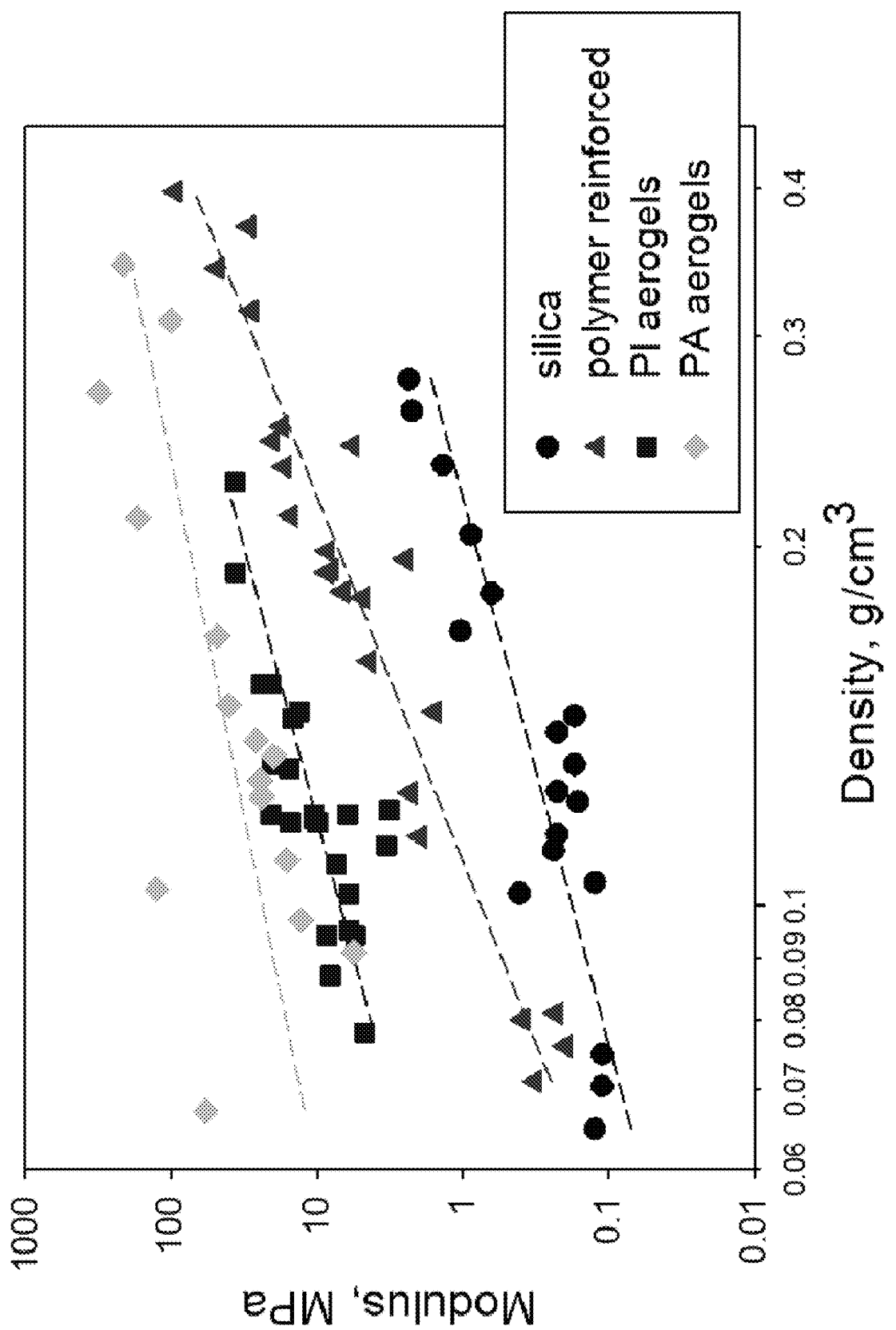
FIG. 18 illustrates the Young's moduli of the polyamide aerogels fabricated in this study, plotted as a function of density along with conventional polyimide, silica, and reinforced silica aerogels.

FIG. 18 illustrates the Young's moduli of the polyamide aerogels fabricated in this study, plotted as a function of density along with conventional polyimide, silica, and reinforced silica aerogels. As can be seen in FIG. 18, with Young's moduli as high as 300 MPa and densities not exceeding 0.33 $g/cm^3$, it is apparent that the PA aerogels produced here stand out as some of the stiffest low-density aerogels ever produced. When the compression data on these materials is graphed as a function of density and compared with aerogels of the prior art, as in FIG. 18, the results are unprecedented. At any given density, aromatic PA aerogels are at least as rigid as polyimides, the next strongest aerogel when compared as a function of density. But interestingly, when comparing these new materials with previously studied aerogels, on a density to density basis, the formulations that use only IPC or only TPC as their source of dicarbonyl have drastically higher compressive moduli than any previously studied aerogel of similar density.

For example, the most rigid polyamide aerogel with a density of 0.1 $g/cm^3$ among those discussed herein is more than an order of magnitude more rigid than polyimide aerogels of similar density. At a density of 0.3 $g/cm^3$, TPC based polyamide aerogels display moduli over 300 MPa while polyimides and polymer reinforced silicas are all still well below 100 MPa at that same density. Overall, two out of the three polymer species explored in this work have been found to be the most rigid aerogels ever known in terms of their densities.

In the experiments discussed herein, three different formulations of polyamide aerogel were produced via the cross-linking of inexpensive oligomers produced through the stepgrowth polymerization of mPDA and various ratios of TPC and IPC. The chemistry employed is straightforward and simple, relying on no catalysts and is applicable to a wide range of aromatic diamines and diacid chlorides. A wide range of surface areas 48-385 m$^2$/g were observed in all three formulations with some being suitable to make flexible thin films and others displaying rigidities (5.6-312.1 MPa) that are unprecedented for porous materials displaying such low densities. Porosities between 76% and 94% were observed and found to correlate inversely with the observed densities (0.06-0.36 g/cm$^3$) of the materials. Relative dielectric constants as low as 1.15 were observed for the materials with lower densities and it was also found that the loss tangents also decreased with density. The demonstration of such a diverse range of properties from a few inexpensive monomers makes this class of aerogels attractive and versatile materials for many applications, aerospace and otherwise.

In further experimental results illustrating aspects of the innovation, aerogels were prepared from both amine end-capped polyamides cross-linked with 1,3,5-benzenetricarbonyl trichloride (BTC) and acid chloride endcapped polyamides cross-linked with 1,3,5-triaminophenoxy benzene (TAB). These and other examples discussed herein are provided solely for the purpose of illustrating aspects of the innovation, which includes numerous other embodiments not specifically illustrated via examples.

In a first example, an aerogel was prepared from TPC/IPC/mPDA, with n=30 and 7.5 w/w %. A solution of mPDA (6.832 g, 63.200 mmol) in NMP (179.96 ml) was cooled to 5° C. using an ice water bath. Isophthaloyl chloride (6.207 g, 30.573 mmol) was added in one portion as a solid and the cooled solution was allowed to stir for 30 minutes. Solid terephthaloyl chloride (6.832 g, 63.200 mmol) was then added and the solution was allowed to stir for an additional 30 minutes. Solid 1,3,5-benzenetricarbonyltrichloride (0.360 g, 1.356 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.12 g/cm$^3$.

In a second example, an aerogel was prepared from TPC/mPDA, with n=30 and 7.5 w/w %. A solution of mPDA (6.832 g, 63.200 mmol) in NMP (179.96 ml) was cooled to 5° C. using an ice water bath. Terephthaloyl chloride (12.414 g, 61.146 mmol) was added in one portion as a solid and the cooled solution was allowed to stir for 60 minutes. 1,3,5-benzenetricarbonyltrichloride (0.360 g, 1.356 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.30 g/cm$^3$.

In a third example, an aerogel was prepared from IPC/mPDA, with n=30 and 7.5 w/w %. A solution of mPDA (6.832 g, 63.200 mmol) in NMP (179.96 ml) was cooled to 5° C. using an ice water bath. Isophthaloyl chloride (12.414 g, 61.146 mmol) was added in one portion as a solid and the cooled solution was allowed to stir for 60 minutes. 1,3,5-benzenetricarbonyl trichloride (0.360 g, 1.356 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.10 g/cm$^3$.

In a fourth example, an aerogel was prepared from IPC/2,2'-dimethylbenzidine (DMBZ), with n=20 and 7.7 w/w %. A solution of 2,2'-dimethylbenzidine (4.0 g, 19.05 mmol) in N-methylpyrrolidone (75 ml) was cooled to 5° C. using an ice water bath. Isophthaloyl chloride (3.68 g, 18.13 mmol) was added in one portion as a solid and the cooled solution was allowed to stir for 60 minutes. 1,3,5-benzenetricarbonyl trichloride (0.160 g, 0.60 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.16 g/cm$^3$.

In a fifth example, an aerogel was prepared from sebacoyl chloride/mPDA, with n=10 and 10 w/w %. A solution of m-phenylene diamine (5.0 g, 46.25 mmol) in N-methylpyrrolidone (106.9 ml) was cooled to 5° C. using an ice water bath. sebacoyl chloride (10.05 g, 42.05 mmol) was added dropwise and the cooled solution was allowed to stir for 60 minutes. 1,3,5-benzenetricarbonyl trichloride (0.372 g, 1.402 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.13 g/cm$^3$.

In a sixth example, an aerogel was prepared from sebacoyl chloride/DMBZ, with n=20 and 10 w/w %. A solution of 2,2'-dimethylbenzidine (4.66 g, 21.95 mmol) in N-methylpyrrolidone (70.37 ml) was cooled to 5° C. using an ice water bath. Sebacoyl chloride (5.0 g, 20.91 mmol) was added dropwise and the cooled solution was allowed to stir for 60 minutes. 1,3,5-benzenetricarbonyl trichloride (0.185 g, 0.697 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight.

In a seventh example, an aerogel was prepared from mPDA/pPDA/IPC/TPC, with n=30 and 7.5 w/w %. A solution of m-phenylenediamine (2.00 g, 18.49 mmol) and p-phenylenediamine (2.00 g, 18.49 mmol) in N-methylpyrrolidone (86 ml) was cooled to 5° C. using an ice water bath. Isophthaloyl chloride (3.63 g, 17.88 mmol) and terephthaloyl chloride (3.63 g, 17.88 mmol) were added in one portion as solids and the cooled solution was allowed to stir for 60 minutes. 1,3,5-benzenetricarbonyl trichloride (0.218 g, 0.819 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight. The resulting aerogel had a density of 0.41 g/cm$^3$.

In an eighth example, an aerogel was prepared from 2,2-bis-[4-(4-aminophenoxy)phenyl]propane (BAPP)/adipoyl chloride, with n=20 and 7.5 w/w %. A solution of BAPP (5.0 g, 12.18 mmol) in N-methylpyrrolidone (76 ml) was cooled to 5° C. using an ice water bath. Adipoyl chloride (2.12 g, 11.60 mmol) was added dropwise and the cooled solution was allowed to stir for 60 minutes. 1,3,5-benzenetricarbonyl trichloride (0.10 g, 0.386 mmol) was added and the mixture was vigorously stirred for 5 minutes before being poured into 25 mL syringe molds lined with Teflon. Gelation occurred within 5 minutes. After aging overnight at room temperature, the monoliths were removed from the molds and placed in 500 mL jars of ethanol in order to exchange the reaction solvent, N-methylpyrrolidone. The solvent in the containers was replaced with fresh ethanol at 24 hour intervals to ensure that all of the NMP was removed from the gels. The gels were then subjected to supercritical $CO_2$ extraction followed by drying (75° C.) in a vacuum oven overnight.

In a ninth example, an aerogel was prepared from hexamethylene diamine/IPC, with n=20 and 7.5 w/w %. Triethylamine (8.65 g, 85.93 mmol) was added to a solution of hexamethylene diamine (5.0 g, 43.03 mmol) in NMP (50 mL). The resulting mixture was then added to a cooled (0° C.) solution of isophthaloyl chloride (8.31 g, 40.98 mmol) in NMP (76.45 mL) dropwise over the course of 5 minutes resulting in a viscous white emulsion. 1,3,5-Benzenetricarbonyl trichloride (0.36 g, 1.36 mmol) was added with vigorous stirring and after one minute, the mixture was poured into syringe molds. Complete gelation was evident within 30 minutes. After standing at room temperature for 24 hours, the gel monolith was removed from the mold and placed in a solution consisting of 25% acetone and 75% NMP. Every 24 hours, the solvent was replaced with a solution containing incrementally larger amounts of acetone (50/50 acetone/NMP to 75/25 acetone/NMP to 100% acetone) until all of the NMP was gone from the monolith. Drying the material with supercritical carbon dioxide provided a white aerogel as a cylinder.

In a tenth example, an aerogel was prepared from 4,4'-oxydianiline/adipoyl chloride with 1,3,5-triaminophenoxy benzene (TAB) as a cross-linking agent. To a solution of 4,4'-oxydianiline (1.041 g, 5.207 mmol) in NMP (5 mL) was added triethyl amine (1.217 g, 12.02 mmol, 1.68 mL). The resulting mixture was then added to a solution of adipoyl chloride (1.00 g, 5.467 mmol) in 7 mL of NMP resulting in the formation of a white viscous emulsion which was then treated with a solution of 1,3,5-triaminophenoxy benzene (0.069 g, 0.174 mmol) in 7.34 mL of NMP. The thick mixture was added to a syringe mold and gelled within three hours. After standing at room temperature for 24 hours, the gel monolith was removed from the mold and placed in a solution consisting of 25% acetone and 75% NMP. Every 24 hours, the solvent was replaced with a solution containing incrementally larger amounts of acetone (50/50 acetone/NMP to 75/25 acetone/NMP to 100% acetone) until all of the NMP was gone from the monolith. Drying the material with supercritical carbon dioxide provided a white aerogel as a cylinder.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An aerogel comprising:
    a microporous polyamide solid phase comprising crosslinked polyamide oligomers prepared by crosslinking amine capped polyamide oligomers having 20 to 40 repeat units with a cross-linking agent, wherein the microporous polyamide solid phase comprises from 20 to 40 repeat units between cross-links; and
    a dispersed gaseous phase.

2. The aerogel of claim 1, wherein the aerogel has a surface area of at least 300 m$^2$/g.

3. The aerogel of claim 1, wherein the aerogel has an x-band dielectric constant of at most 1.2.

4. The aerogel of claim 1, wherein the aerogel has a density of at most 0.3 g/cm$^3$.

5. The aerogel of claim 1, wherein the aerogel has a Young's modulus of at least 300 MPa.

6. The aerogel of claim 1, wherein the aerogel comprises a thin film.

7. The aerogel of claim 1, wherein the amine capped polyamide oligomers are made from reacting a diamine component with a diacid chloride component.

8. The aerogel of claim 7, wherein the diamine component comprises m-phenylenediamine (mPDA) or p-phenylenediamine (pPDA).

9. The aerogel of claim 8, wherein the chloride component comprises isophthaloyl diacid chloride (IPC), terephthaloyl chloride (TPC), or a combination thereof.

10. The aerogel of claim 7, wherein the diamine component and the diacid chloride component are reacted in N-methylpyrrolidinone (NMP).

11. The aerogel of claim 7, wherein the amine capped polyamide oligomers are cross-linked using benzenetricarbonyl trichloride (BTC) as a cross-linking agent.

* * * * *